United States Patent

Ishiwata et al.

[11] Patent Number: 6,154,345
[45] Date of Patent: Nov. 28, 2000

[54] MAGNETORESISTIVE EFFECT COMPOSITE HEAD

[75] Inventors: Nobuyuki Ishiwata; Kiyotaka Shimabayashi; Sinsaku Saitho; Hiroaki Tachibana; Tsutomu Ishi; Kiyokazu Nagahara; Kazumasa Kumagai, all of Tokyo, Japan

[73] Assignee: NEC Corporation, Tokyo, Japan

[21] Appl. No.: 09/055,125

[22] Filed: Apr. 6, 1998

[30] Foreign Application Priority Data

Apr. 7, 1997 [JP] Japan .................................. 9-088463

[51] Int. Cl.$^7$ .............................................. G11B 5/39
[52] U.S. Cl. ............................................................ 360/317
[58] Field of Search ........................................ 360/113, 317

[56] References Cited

U.S. PATENT DOCUMENTS

| 5,438,747 | 8/1995 | Kroumbi et al. | 29/603 |
| 5,652,687 | 7/1997 | Chen et al. | 360/126 |
| 5,805,391 | 9/1998 | Chang et al. | 360/113 |

FOREIGN PATENT DOCUMENTS

| 5-46945 | 2/1993 | Japan . |
| 5-334621 | 12/1993 | Japan . |
| 7-129929 | 5/1995 | Japan . |
| 7-225917 | 8/1995 | Japan . |
| 7-262519 | 10/1995 | Japan . |
| 7-296328 | 11/1995 | Japan . |

OTHER PUBLICATIONS

Robert P. Hunt, "A Magnetoresistive Readout Transducer", *IEEE Transactions on Magnetics*, vol. Mag–7, No. 1, Mar. 1971, pp. 150–154.

Chang Tsang et al., "Design, Fabrication & Testing of Spin–Valve Read Heads for High Density Recording", *IEEE Transactions on Magnetics*, vol. 30, No. 6, Nov. 1994, pp. 3801–3806.

*Primary Examiner*—Robert S. Tupper
*Attorney, Agent, or Firm*—Sughrue, Mion, Zinn, Macpeak & Seas, PLLC

[57] ABSTRACT

An ID head is formed after a MR head is formed. An upper shield far from a substrate is a first magnetic pole. A nonmagnetic insulator existing through a magnetic gap on the first magnetic pole determines zero throat height, thereby specifying a recording track width of less than 2 $\mu$m. The ID head comprises a front end portion of a second magnetic pole, which is exposed to ABS and partly rides over the nonmagnetic insulator, a nonmagnetic insulator for burying a step by the front end portion, a coil which is formed on the nonmagnetic insulator and covered with a nonmagnetic insulator, and a main body portion of the second magnetic pole formed so as to ride over the coil and front end portion. As a result, it is possible to solved various problems of the ID head in which the front end portion of the second magnetic pole is formed first to realize a narrow track width.

41 Claims, 43 Drawing Sheets

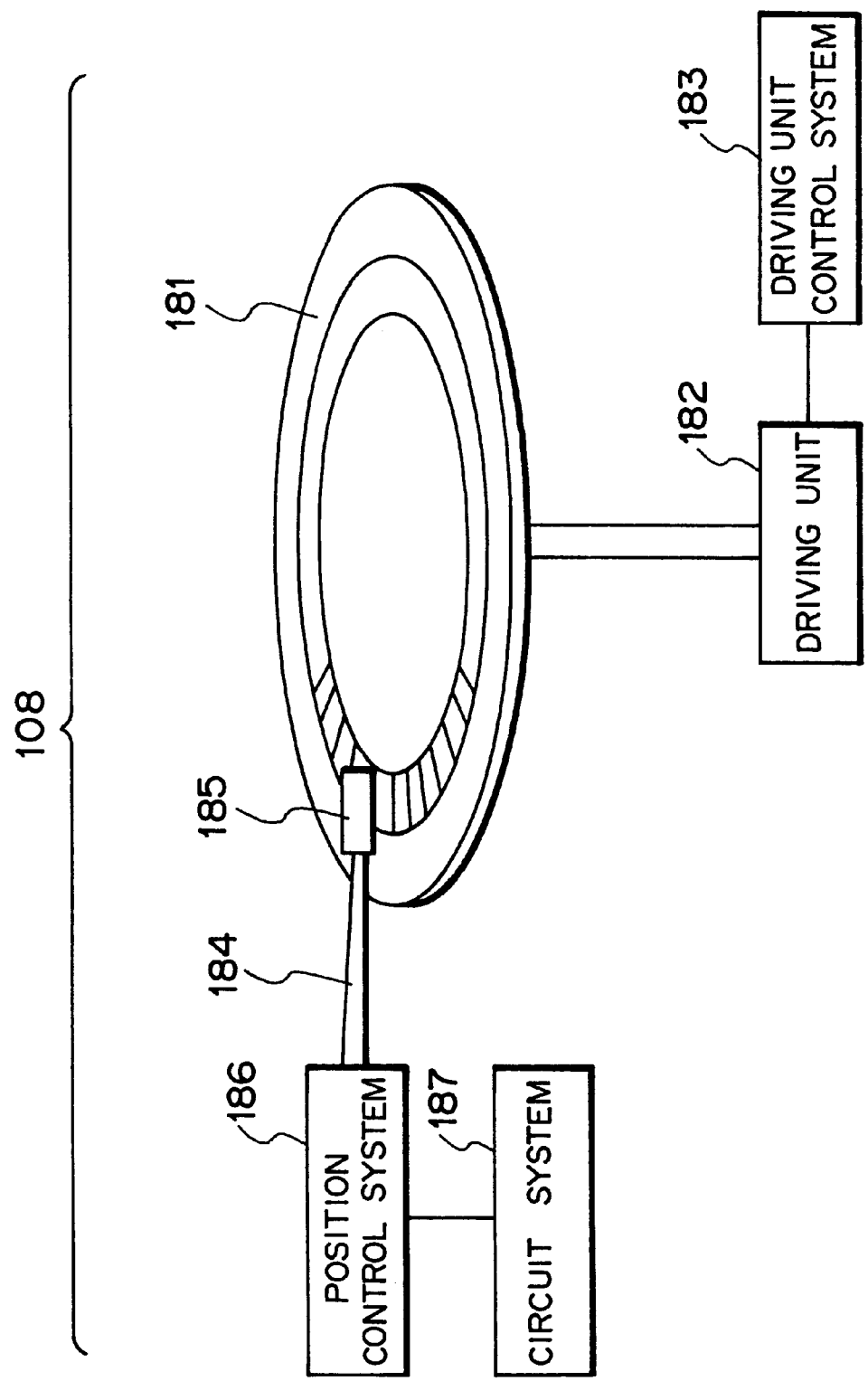

MAGNETORESISTIVE EFFECT COMPOSITE HEAD

BACKGROUND OF THE INVENTION

1. Field of the Invention

This invention relates to a composite head comprising a read head using magnetoresistive effect and an inductive recording head, more particularly to a magnetoresistive effect composite head (hereinafter referred to as "composite head") of high density having a track width of less than 2 μm and a magnetic storage apparatus using the same.

2. Description of the Related Art

Recently, a magnetoresistive effect type head (hereinafter referred to as MR head) has been more and more demanded because a relative speed between a magnetic reading head and a magnetic recording medium has been decreased with accelerated reduction of size of the magnetic recording medium and increased capacity thereof. This MR head has been discussed under a title of "A Magnetoresistivity Read-out Transducer" of "IEEE Trans. on Magn,. MAG7(1970) 150".

Further, a giant magnetoresistive effect (hereinafter referred to as GMR) type head using giant magnetoresistive effect capable of realizing a higher output than the aforementioned MR head has attracted much attention these days. In this GMR head, particularly magnetoresistive effect generally called spin valve effect, that a resistance change corresponds to cosine between magnetizing directions of two adjacent magnetic layers, causes a large change in resistance with a small operating magnetic field. Thus, this GMR is expected to be the next generation MR head. The MR head using this spin valve effect has been discussed under a title of "Design, Fabrication & Testing of Spin-Valve Read Heads for High Density Recording" in "IEEE Trans. on Magn,. Vol.30, No.6(1994)3801". As stated in this paper, one magnetic layer of the two magnetic layers generating spin valve effect acts as a magnetization fixing layer, in which magnetization is fixed to substantially agree with the direction of medium magnetic field entering a head sensitive portion by switched connection, which is caused by overlaying antiferromagnetic film on this magnetic layer. Then, another magnetic layer adjacent to the aforementioned one through this magnetization fixing layer and conductive layer such as Cu is a magnetization free layer, in which magnetization direction can be changed freely relative to medium magnetic field.

Actually, a laminated structure for generating this spin valve effect is used as the composite head shown in FIG. 42. FIG. 42 is a schematic view of the structure of the composite head taken from air bearing surface (ABS) which is a face opposing a medium. That is, a laminated structure for generating spin valve effect is formed by disposing a central region 16 through magnetic separating layers 13, 17 made of insulators between the lower shield 12 and upper shield 18, which are overlaid on a ceramic 11 which acts as a slider. On both sides of this central region 16 are formed end portion regions 14, 15 for supplying current and bias magnetic field to the central region 16. That aforementioned spin valve element executes reproduction. Further, the upper shield 18 serves as a first magnetic pole 18a and then a second magnetic pole 110 is overlaid on a surface opposite to the spin valve element, of this magnetic pole 18a through a magnetic gap 19 such that the second magnetic pole 110 is in parallel to the magnetic pole 18a. A coil (not shown) surrounded by insulator is disposed deeper than the magnetic poles 18a, 110, so that recording is carried out by magnetic flux leaking from the magnetic gap 19 between the magnetic poles 18a and 110 magnetized by a magnetic field generated by this coil. Such a structure in which the read MR head and recording inductive (hereinafter referred to as ID) head are overlaid is a composite head using practical spin effect.

Meanwhile, the recording density under which the composite head using the spin valve effect is actually used is considered to be high density recording region of more than 3 GB per 1 square inch. In recording density lower than this, a composite head employing the MR head using magnetic anisotropy has been used since before. Namely, a spin valve head meaningful in practical field is limited to one achieving high density recording/reproduction of more than 3 GB per 1 square inch. A magnetic recording apparatus build using the spin valve head is a high density recording/reading apparatus of more than 3 GB per 1 square inch.

Basically patterning technology for determining the central region 16 which serves as a reproducing track width of the spin valve head can utilize semiconductor technology because this technology must only correspond to thin spin valve film or the like. By using i-line stepper, sub-micron level patterning can be achieved. On the other hand, the width of a front end portion of the magnetic pole 110 for determining the recording track width on the ABS is required to be narrow.

However, in a conventional ID head process, namely, in such a process in which the magnetic pole 18a is formed, then a coil covered with insulator layer is formed and the magnetic pole 110 is formed, frame resist for determining an external shape of the magnetic pole 110 must be formed in a condition that it rides over the coil covered with the insulator layer having a large step difference. Further, narrowing of the end portion of the magnetic pole 110 for determining the recording track width is difficult because it is located very near the end portion of the insulator layer, so that its limit is about 2 μm. To achieve a high density recording of more than 3 GB per 1 square inch, a recording track width of less than 2 μm, actually less than 1.5 μm is needed. Therefore, in the conventional ID head process, it is difficult to produce a composite head meaningful in practical field using the spin valve effect.

As a method for surpassing the limit of the front end width of the second magnetic pole of this ID head, Japanese Patent Application Laid-Open No. 7-225917 has disclosed a method in which only the front end portion of the second magnetic pole for determining the track width is formed before formation of the coil covered with the insulator layer and then the coil and remaining second magnetic pole entirely are formed. It is generally said that, according to this method for forming the front end portion of the second magnetic pole first, a second magnetic pole having a narrow end width of about 1 μm can be produced. FIGS. 43, 44 are sectional views of the ID head stated by the aforementioned patent publication. Referring to FIG. 43, the second magnetic pole comprises a main body portion 24 and a front end portion 23, the front end portion 23 being produced first. In FIG. 44, the second magnetic pole comprises a main body portion 34 and a front end portion 33. The front end portion 33 is properly positioned on a front end portion 31b of the first magnetic pole through a magnetic gap 32 in the width direction thereof. In FIGS. 43, 44, the front end portions 23, 31b, 33 for determining the recording width are patterned by ion beam etching before insulator layers 25, 35 are formed. That is, according to this method, the zero height position is determined by patterning when the front end portions 23, 33 of the second magnetic pole are formed.

However, if the ID head is produced actually in this method, following two fatal faults occur although they are not estimated in the aforementioned patent publication.

One of them is that, as for the front end portion of the second magnetic pole (hereinafter referred to as magnetic pole front end portion) produced first, if considering in viewpoints of cost, patterning by frame plating method is much more advantageous than patterning by ion beam etching. However, because if the magnetic pole front end portion is formed by this frame plating method, the magnetic pole front end portion is determined at throat height (length from an end of the insulator layer covering the coil up to ABS) zero, the resist shape for forming a frame is enclosed in the U-shape. Therefore, if a magnetic pole of NiFe is formed by ordinary paddle plating, plating solution cannot flow sufficiently into this enclosed portion. As a result, the composition of the formed plating film changes so that the magnetic characteristic of the magnetic pole front end portion requiring the best magnetic characteristic is deteriorated or deviated. Consequently, abnormal phenomenon occurs in generation of magnetic flux at the magnetic pole front end portion, so that the recording characteristic is deteriorated or deviated thereby leading to a large reduction of yield rate.

Another point is that in the second magnetic pole, deviation of the throat height becomes very large. The throat height length must be strictly controlled because it affects largely the recording characteristic such as overwrite characteristic of the ID head. However, in this head, the resist shape for forming the frame is enclosed in the U shape and further the gap of this enclosed portion is as small as less than 2 μm. As a result, the inside angle of this enclosed portion and resist width deflect, so that substantial control of the throat height length is impossible. Thus, yield rate is largely reduced. In conclusion, as described above, a method for producing first the magnetic pole front end portion which determines the recording track width as a process considering production cost has not been yet established.

SUMMARY OF THE INVENTION

An object of the present invention is to solve various problems of the ID head in which a second magnetic pole is formed first to realize a narrow track width and then provide a structure of a composite head available for practical use which utilizes spin valve effect to realize high density recording and reproduction of more than 3 GB per 1 square inch, a production method thereof and a magnetic recording apparatus using the same.

The present invention concerns a composite head containing a MR head having a function for reading an ID head having a function for recording and a production method for the same as shown in FIGS. 1, 2. The MR head comprises a lower shield 42 on a substrate 41 acting as a slider, an upper shield 43 and a MR element 46 which is interposed between the lower shield 42 and upper shield 43 and exists through magnetic separating layers 44 and 45 made of insulator. The ID head is formed after the MR head is formed. The ID head comprises a first magnetic pole 431 which is the upper shield 43 far from the substrate 41, a front end portion 410 of a second magnetic pole 49 in which zero throat height is determined by a nonmagnetic insulator 48 which exists on the magnetic pole 431 through a magnetic gap 47 so as to determine a recording track width of less than 2 μm and which is exposed to the ABS, partly riding over the nonmagnetic insulator 48, a nonmagnetic insulator 412 for burying a step difference by the front end portion 410, a coil covered with a nonmagnetic insulator 413 formed on the nonmagnetic insulator 412, and a main body portion of the second magnetic pole 49 formed so as to ride over the coil 414 and front end portion 410. Particularly the MR element 46 is preferred to utilize magnetoresistive effect generally called spin valve effect that a resistance change corresponds to cosine between magnetizing directions of two adjacent magnetic layers.

A basic production method of the structure of the present invention comprises step of forming the nonmagnetic insulator 48 made of photo resist on the magnetic gap 47, step of forming the front end portion 410 by frame plating method, step of ion beam etching a ground film of the front end portion 410, step of forming the nonmagnetic insulator 412 made of alumina film for burying the front end portion 410 and then removing the alumina film on the front end portion 410 by ion beam etching, step of forming a coil 414 covered with the nonmagnetic insulator 413 and step of forming a main body portion 411 by frame plating. By the structure and production method of the present invention, it is possible to obtain a composite head preferable for high density recording and reproduction in which the recording track width is less than 2 μm under a high yield rate.

By using material having a large saturated magnetization for a magnetic film 510 on the ground of a front end portion 509 of a second magnetic pole 59 under this structure as shown in FIGS. 3, 4, the linear recording density is improved. According to the present invention, a problem in producing the front end portion 509 having a narrow width for determining the recording track width as described above can be solved. That is, if a magnetic film 511 of the front end portion 509 is formed by frame plating method of low production cost under the structure of the present invention, although the shape of the frame is basically enclosed, a portion in which plating solution cannot flow sufficiently retreats to a portion partly riding over the nonmagnetic insulator 58. Therefore, magnetic characteristic between the ABS of the front end portion 509 and zero throat height is maintained favorably. Further, because the zero throat height position is preliminarily specified by the nonmagnetic insulator 58, the throat height length is not affected by instability of the shape of the enclosed portion of resist frame.

A magnetic recording apparatus using the composite head of the present invention is generally a magnetic disc apparatus as shown in FIG. 5. The magnetic disc apparatus 180 comprises a rotatable, circular-shape magnetic recording medium 181, a driving unit 182, a driving unit control system 183, a head suspension assembly 184, a composite head 185 installed on the head suspension assembly 184, having recording/reproduction function, a position control system 186, a circuit system 187 for processing signal from the composite head 185 and signal to the composite head 185, and the like. The above components are disposed within a small frame. The composite head 185 opposes a magnetic medium across the ABS, achieving recording and reproduction of high density of more than 3 GB per 1 square inch. Particularly in the composite head in which material having a large saturated magnetization is introduced near the magnetic gap of the second magnetic pole as shown in FIGS. 3, 4, high density recording and reproduction of as high as 10 GB per 1 square inch is realized.

According to the present invention, the aforementioned problem of the ID head that the front end portion of the recording magnetic pole for determining the recording track width is formed first to realize a narrow track width is solved. As a result, a structure of a composite head for spin valve head reproduction and ID head recording, meaningful for practical application, which uses spin valve effect realizing high density recording and reproduction of more than 3 GB per 1 square inch, a production method thereof and a magnetic recording apparatus using the same are realized. The present invention can be applied to a case in which the spin valve element controlling reproduction function utilize MR element based on magnetoresistive effect applying conventional anisotropy. The CoTaZr film mentioned in the embodiments of the present invention is a magnetic film composed of mainly Co—M (M is at least one element selected from Ti, V, Cr, Zr, Nb, Hf, Ta and W) or Fe—M—N (M is at least one element selected from Ti, V, Cr, Zr, Nb, Hf, Ta, and W), so that the same effect can be obtained.

BRIEF DESCRIPTION OF THE DRAWINGS

FIG. 5 is a schematic structure diagram of a magnetic recording apparatus using the composite head according to the present invention;

FIGS. 6A to 6D show a production method for the first embodiment of the composite head according to the present invention, while FIGS. 6A and 6C are front views taken from the air bearing surface and FIGS. 6B and 6D are sectional views perpendicular to the air bearing surface;

FIGS. 7A to 7D show a production method for the first embodiment of the composite head according to the present invention, while FIGS. 7A and 7C are front views taken from the air bearing surface and FIGS. 7B and 7D are sectional views perpendicular to the air bearing surface;

FIGS. 8A to 8D show a production method for the first embodiment of the composite head according to the present invention, while FIGS. 8A and 8C are front views taken from the air bearing surface and FIGS. 8B and 8D are sectional views perpendicular to the air bearing surface;

FIGS. 9A to 9D show a production method for the first embodiment of the composite head according to the present invention, while FIGS. 9A and 9C are front views taken from the air bearing surface and FIGS. 9B and 9D are sectional views perpendicular to the air bearing surface;

FIGS. 10A to 10D show a production method for the first embodiment of the composite head according to the present invention, while FIGS. 10A and 10C are front views taken from the air bearing surface and FIGS. 10B and 10D are sectional views perpendicular to the air bearing surface;

FIGS. 14A to 14D show a production method for the third embodiment of the composite head according to the present invention, while FIGS. 14A and 14C are front views taken from the air bearing surface and FIGS. 14B and 14D are sectional views perpendicular to the air bearing surface;

FIGS. 15A to 15D show a production method for the third embodiment of the composite head according to the present invention, while FIGS. 15A and 15C are front views taken from the air bearing surface and FIGS. 15B and 15D are sectional views perpendicular to the air bearing surface;

FIGS. 16A to 16D show a production method for the third embodiment of the composite head according to the present invention, while FIGS. 16A and 16C are front views taken from the air bearing surface and FIGS. 16B and 16D are sectional views perpendicular to the air bearing surface;

FIGS. 17A to 17D show a production method for the third embodiment of the composite head according to the present invention, while FIGS. 17A and 17C are front views taken from the air bearing surface and FIGS. 17B and 17D are sectional views perpendicular to the air bearing surface;

FIGS. 18A to 18D show a production method for the third embodiment of the composite head according to the present invention, while FIGS. 18A and 18C are front views taken from the air bearing surface and FIGS. 18B and 18D are sectional views perpendicular to the air bearing surface;

FIGS. 19A to 19D show a production method for the fourth embodiment of the composite head according to the present invention, while FIGS. 19A and 19C are front views taken from the air bearing surface and FIGS. 19B and 19D are sectional views perpendicular to the air bearing surface;

FIGS. 20A to 20D show a production method for the fourth embodiment of the composite head according to the present invention, while FIGS. 20A to 20C are front views taken from the air bearing surface and FIGS. 20B and 20D are sectional views perpendicular to the air bearing surface;

FIGS. 21A to 21D show a production method for the fourth embodiment of the composite head according to the present invention, while FIGS. 21A and 21C are front views taken from the air bearing surface and FIGS. 21B and 21D are sectional views perpendicular to the air bearing surface;

FIGS. 22A to 22D show a production method for the fourth embodiment of the composite head according to the present invention, while FIGS. 22A and 22C are front views taken from the air bearing surface and FIGS. 22B and 22D are sectional views perpendicular to the air bearing surface;

FIGS. 23A to 23D show a production method for the fourth embodiment of the composite head according to the present invention, while FIGS. 23A and 23C are front views taken from the air bearing surface and FIGS. 23B and 23D are sectional views perpendicular to the air bearing surface;

FIGS. 25A to 25D show a production method for the fifth embodiment of the composite head according to the present invention, while FIGS. 25A and 25C are front views taken from the air bearing surface and FIGS. 25B and 25D are sectional views perpendicular to the air bearing surface;

FIGS. 26A to 26D show a production method for the fifth embodiment of the composite head according to the present invention, while FIGS. 26A and 26C are front views taken from the air bearing surface and FIGS. 26B and 26C are sectional views perpendicular to the air bearing surface;

FIGS. 27A to 27D show a production method for the fifth embodiment of the composite head according to the present invention, while FIGS. 27A and 27C are front views taken from the air bearing surface and FIGS. 27B and 27D are sectional views perpendicular to the air bearing surface;

FIGS. 28A to 28D show a production method for the fifth embodiment of the composite head according to the present invention, while FIGS. 28A and 28C are front views taken from the air bearing surface and FIGS. 28B and 28D are sectional views perpendicular to the air bearing surface;

FIGS. 29A to 29D show a production method for the fifth embodiment of the composite head according to the present invention, while FIGS. 29A and 29C are front views taken from the air bearing surface and FIGS. 29B and 29D are sectional views perpendicular to the air bearing surface;

FIGS. 31A to 31D show a production method for the sixth embodiment of the composite head according to the present invention, while FIGS. 31A and 31C are front views taken from the air bearing surface and FIGS. 31B and 31D are sectional views perpendicular to the air bearing surface;

FIGS. 32A to 32D show a production method for the sixth embodiment of the composite head according to the present invention, while FIGS. 32A and 32C are front views taken from the air bearing surface and FIGS. 32B and 32D are sectional views perpendicular to the air bearing surface;

FIGS. 33A to 33D show a production method for the sixth embodiment of the composite head according to the present invention, while FIGS. 33A and 33C are front views taken from the air bearing surface and FIGS. 33B and 33D are sectional views perpendicular to the air bearing surface;

FIGS. 34A to 34D show a production method for the sixth embodiment of the composite head according to the present invention, while FIGS. 34A and 34C are front views taken from the air bearing surface and FIGS. 34B and 34D are sectional views perpendicular to the air bearing surface;

FIGS. 35A to 35D show a production method for the sixth embodiment of the composite head according to the present invention, while FIGS. 35A and 35C are front views taken from the air bearing surface and FIGS. 35B and 35D are sectional views perpendicular to the air bearing surface;

FIGS. 37A to 37D show a production method for the second embodiment of the composite head according to the present invention, while FIGS. 37A and 37C are front views taken from the air bearing surface and FIGS. 37B and 37D are sectional views perpendicular to the air bearing surface;

FIGS. 38A to 38D show a production method for the second embodiment of the composite head according to the present invention, while FIGS. 38A and 38C are front views taken from the air bearing surface and FIGS. 38B and 38D are sectional views perpendicular to the air bearing surface;

FIGS. 39A to 39D show a production method for the second embodiment of the composite head according to the present invention, while FIGS. 39A and 39C are front views taken from the air bearing surface and FIGS. 39B and 39D are sectional views perpendicular to the air bearing surface;

FIGS. 40A to 40D show a production method for the second embodiment of the composite head according to the present invention, while FIGS. 40A and 40C are front views taken from the air bearing surface and FIGS. 40B and 40D are sectional views perpendicular to the air bearing surface;

FIGS. 41A to 41D show a production method for the second embodiment of the composite head according to the present invention, while FIGS. 41A and 41C are front views taken from the air bearing surface and FIGS. 41B and 41D are sectional views perpendicular to the air bearing surface;

DESCRIPTION OF THE PREFERRED EMBODIMENTS

Hereinafter, the embodiments of the present invention will be described in detail with reference to the accompanying drawings.

Figure 1:
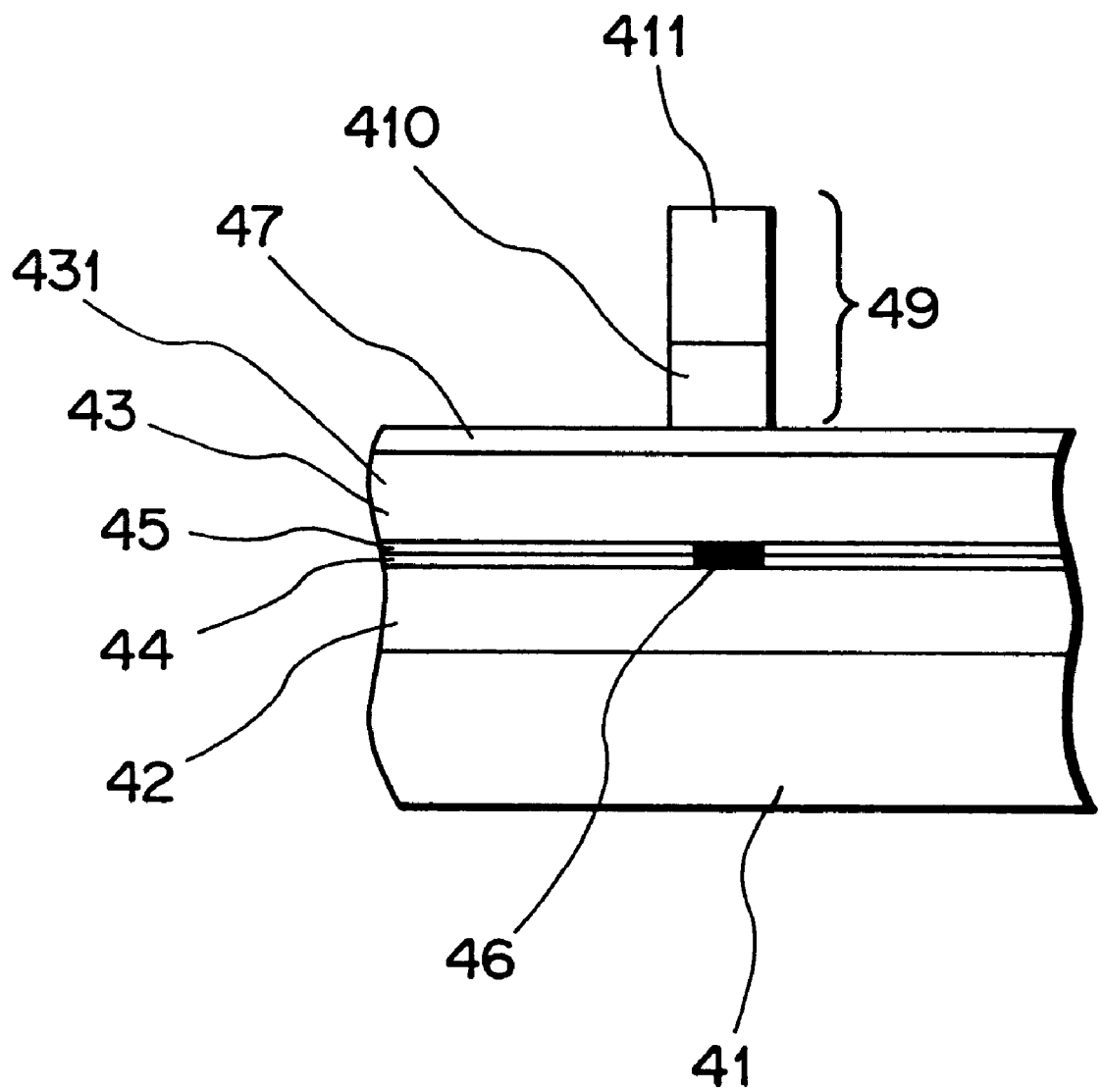
FIG. 1 is a front view taken from air bearing surface, showing a first embodiment of a composite head according to the present invention.
Figure 2:
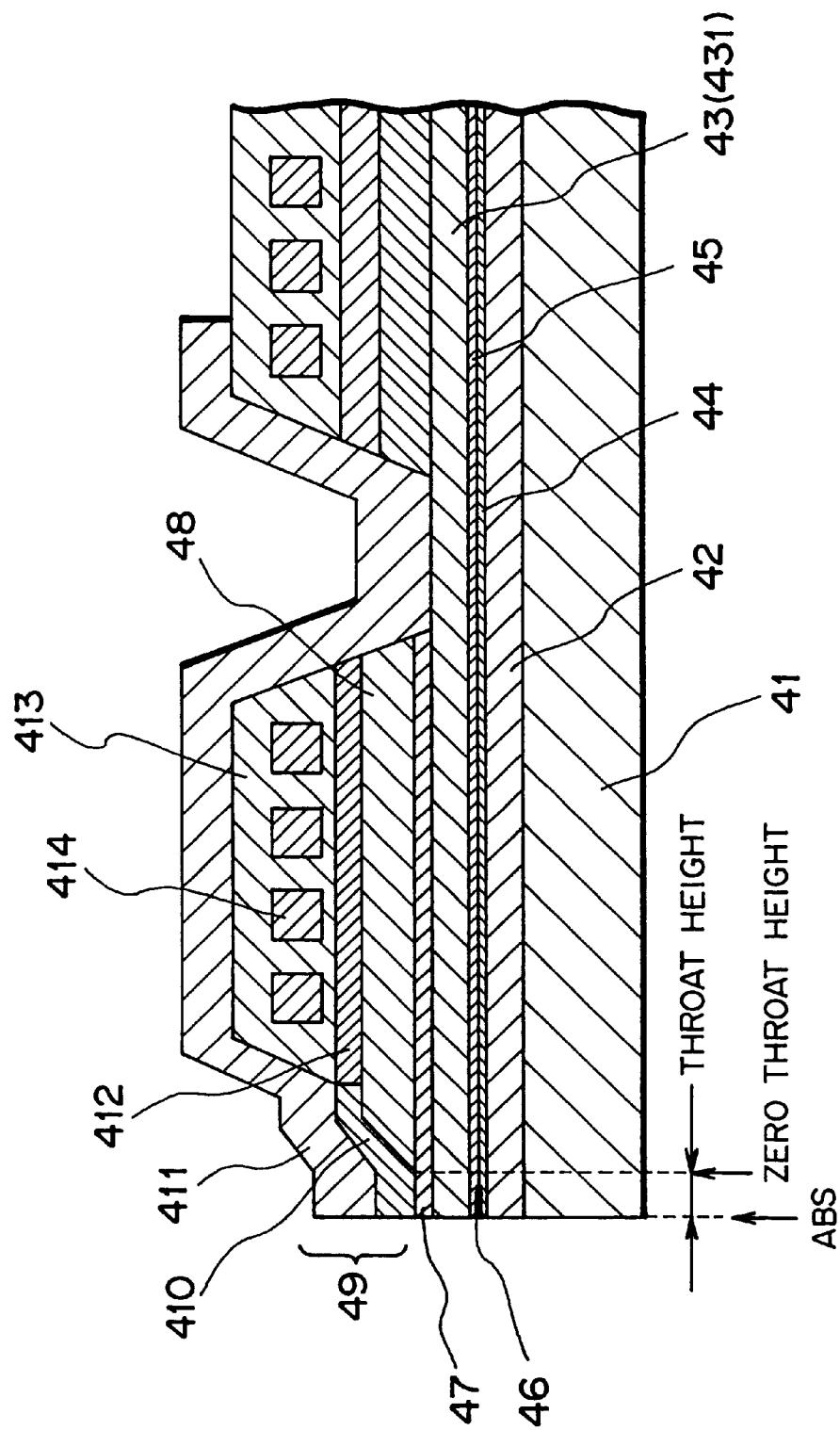
FIG. 2 is a sectional view perpendicular to the air bearing surface showing the first embodiment of the composite head according to the present invention.
Figure 42:
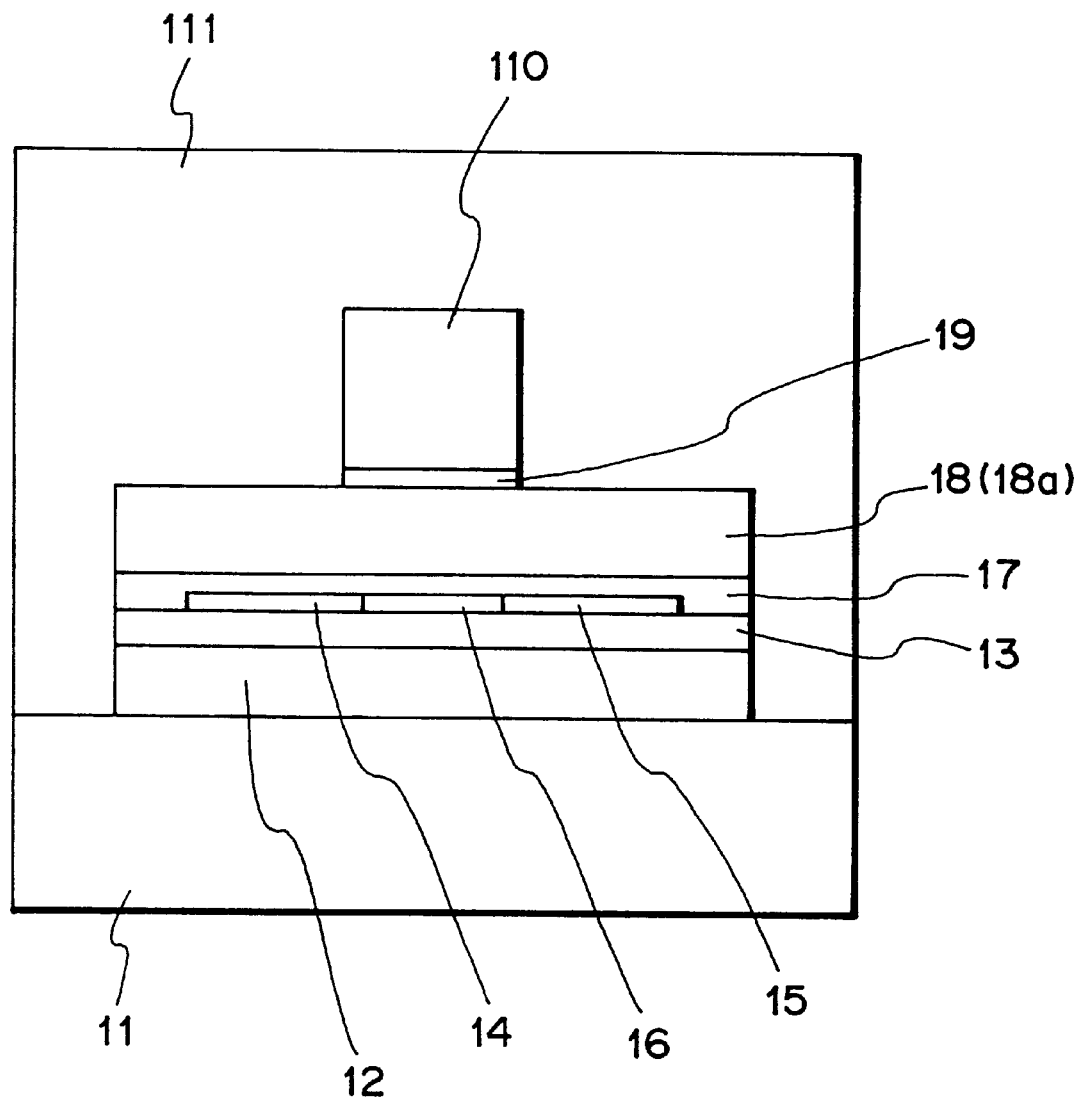
FIG. 42 is a front view taken from the air bearing surface showing a first example of the conventional composite head.
Figure 43:
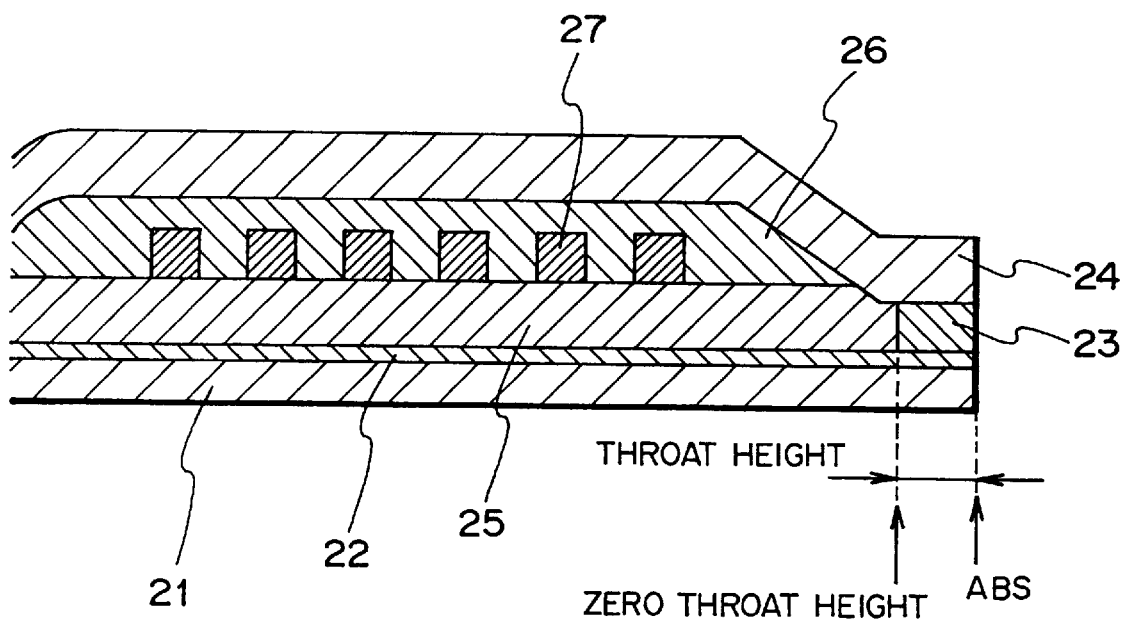
FIG. 43 is a sectional view perpendicular to the air bearing surface showing a second example of the conventional composite head.
Figure 44:
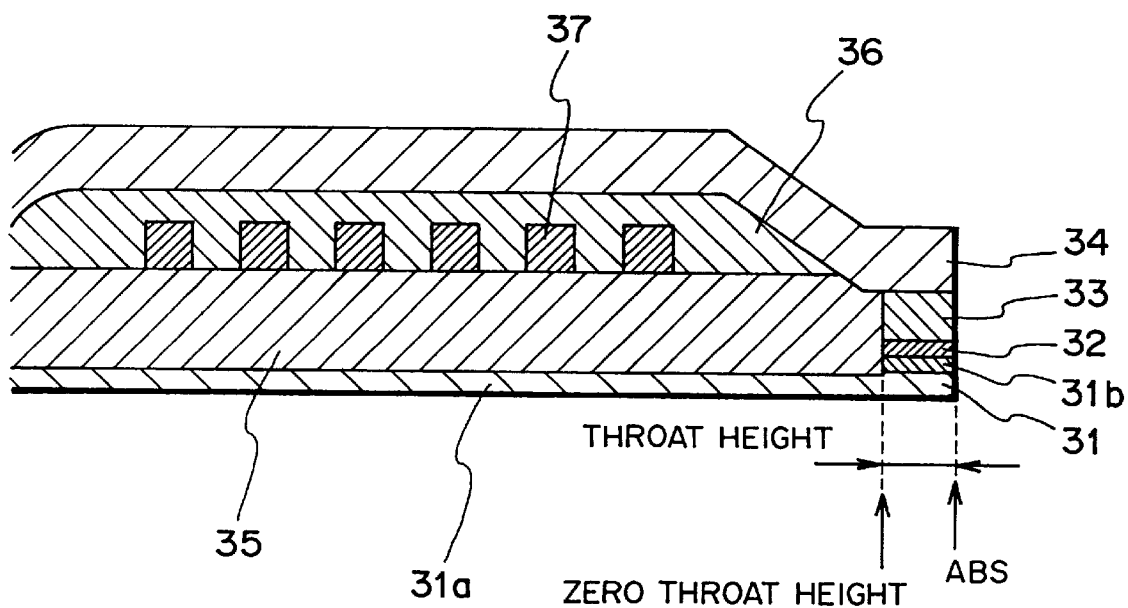
FIG. 44 is a sectional view perpendicular to the air bearing surface showing a third example of the conventional composite head.

FIGS. 1, 2 show a first embodiment of the present invention while FIG. 1 is a view taken from ABS and FIG. 2 is a sectional view taken perpendicular to the ABS. A substrate 41 acting as a slider is composite ceramic composed of alumina and titan carbide. MR head having a reading function is formed thereon. This MR head comprises a lower shield 42 made of patterned CoZrTa film, upper shield 43 made of NiFe film, and MR element 46 which is interposed therebetween and exists through magnetic separating layers 44, 45. The thickness of the lower shield 42 is 1 $\mu$m and the thickness of the upper shield 43 is 3 $\mu$m. There is a gap of 0.2 $\mu$m between the lower shield 42 and upper shield 43. As shown in FIG. 42, the MR element 46 existing in this gap comprises a central region 16 sensitive to magnetic field of a recording medium and end portion regions 14, 15 having a function for supplying bias magnetic field and current to this central region. This central region 16 is formed of a laminated structure having MR effect generally called spin valve effect and concretely contains bottom Ta film (film thickness 5 nm), NiFe film (film thickness, 8 nm), Cu film (film thickness, 2.5 nm), NiFe film (film thickness, 3 nm), and NiMn film (film thickness, 30 nm), which are arranged in this order from the lower shield 42. The central region 16 has a width of 1.2 $\mu$m, determining reproducing track width.

On this MR head is formed ID head having a recording function by using the upper shield 43 as a first magnetic pole 431. In this ID head, the upper shield 43 serves as a first magnetic pole 431, and a nonmagnetic insulator 48 existing through a magnetic gap 47 made of alumina 0.35 $\mu$m in thickness formed on the magnetic pole 431 determines zero throat height. This nonmagnetic insulator 48 is formed of photo resist, having a thickness of 2 $\mu$m. Further, a front end portion 410 of a second magnetic pole 49 is formed, the front end portion 410 being exposed to the ABS opposing the magnetic medium and partly riding over the nonmagnetic insulator 48. A step difference produced by this front end portion 410 is filled with nonmagnetic insulator 412. The front end portion 410 determines a recording track width of 1.5 $\mu$m and the thickness thereof on the ABS is 1.5 $\mu$m. Further, Cu coil 414 is formed on the nonmagnetic insulator 412, the Cu coil 414 being covered with nonmagnetic insulator 413 formed of photo resist. Then, a main body 411 is formed so as to ride over the coil 414 and front end portion 410. The thickness of the magnetic pole 49 on the ABS is 3 $\mu$m. This composite head realizes high density magnetic recording reproduction of 3 GB per 1 square inch.

Production method of this composite head will be described with reference to FIGS. 6 to 10. FIGS. 6 to 10 show production method for the embodiment of the magnetoresistive effect composite head according to the present invention. In the same Figures, production process of the read head is omitted and only production process of the recording ID head is shown.

Figure 6A:
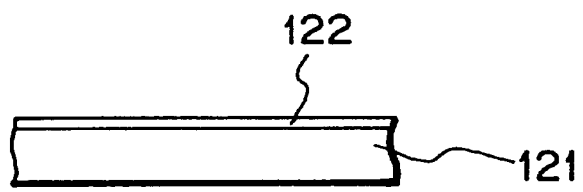
Figure 6B:
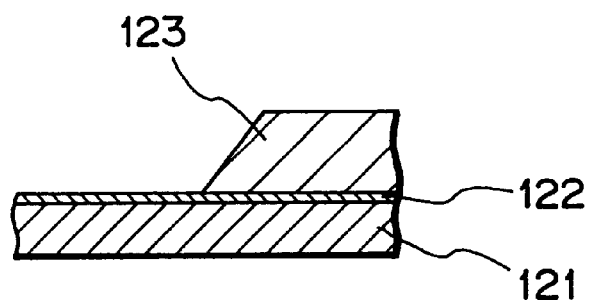
Figure 6C:
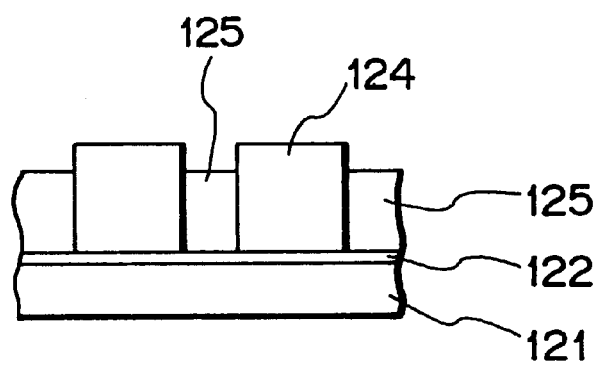
Figure 6D:
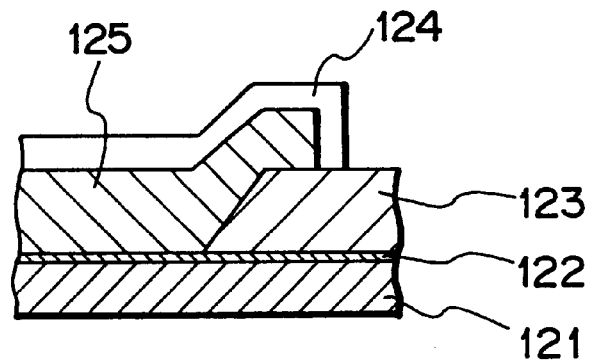
Figure 7A:
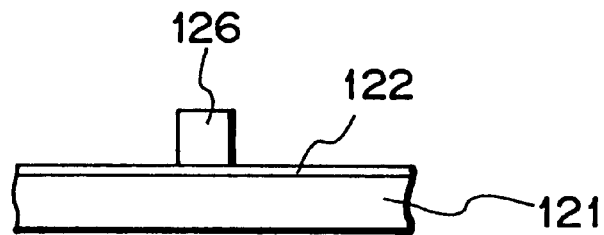
Figure 7B:
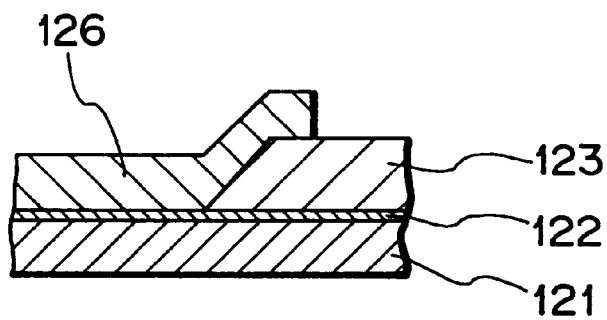
Figure 7C:
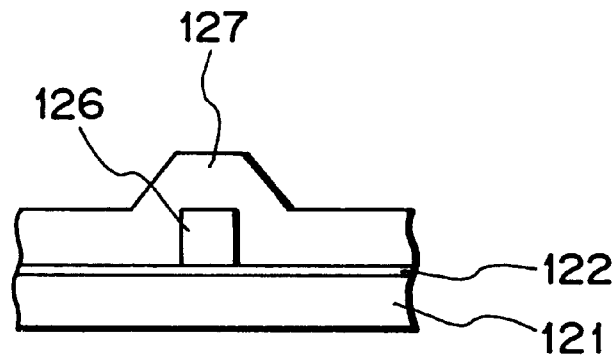
Figure 7D:
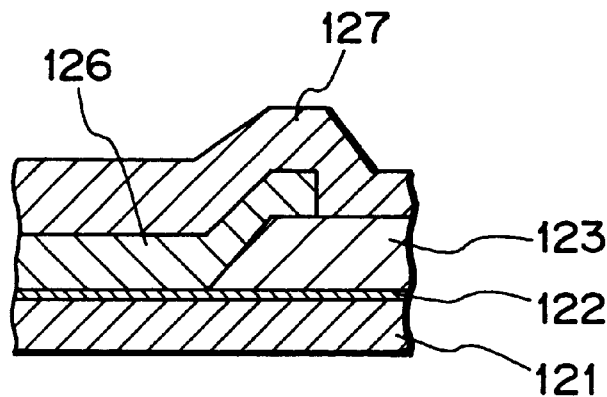
Figure 8A:
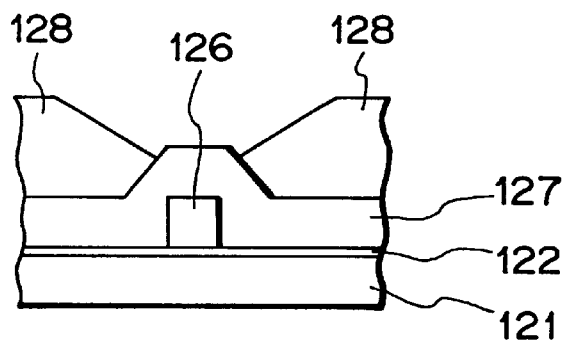
Figure 8B:
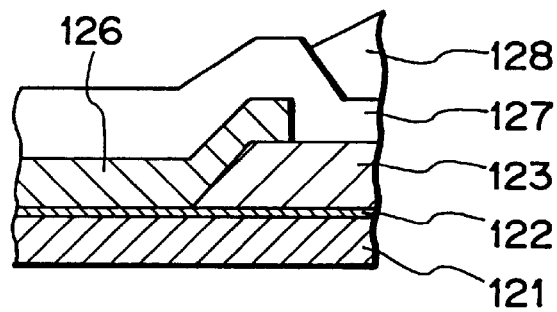
Figure 8C:
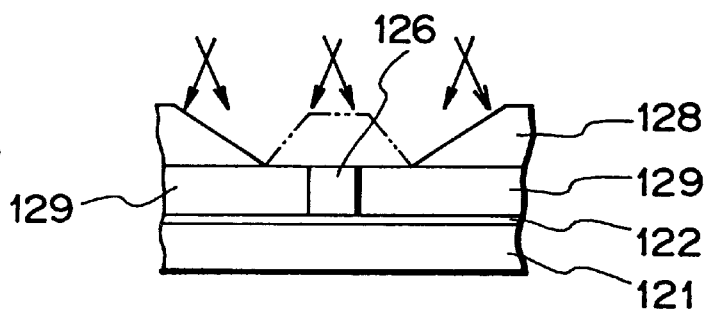
Figure 8D:
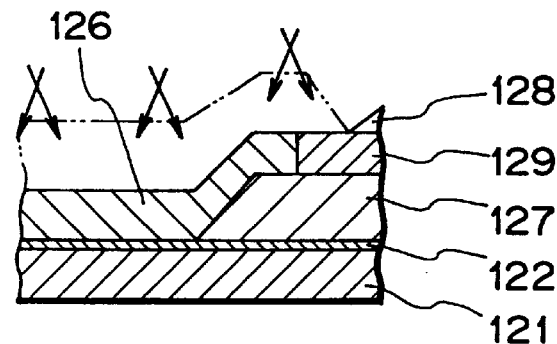

In pole height position defining nonmagnetic insulator forming step, photo resist pattern 123 is formed on a magnetic pole 121 and magnetic gap 122 at a good precision (FIGS. 6A and 6B). At front end magnetic pole forming step, first a resist frame 124 is formed so as to ride over the magnetic gap 122 and photo resist pattern 123 (FIGS. 6C and 6D). This resist frame 124 encloses space on the photo resist pattern 123. Because a step difference by the photo resist pattern 123 is as high as 2 to 3 μm at this time, the thickness of the resist frame 124 below the step difference can be about 4 μm, so that a narrow frame interval of 1.5 μm can be realized. After that, NiFe layer 125 which is a second magnetic pole front end portion 126 is formed by plating method. The front end portion 126 having a width of about 1.5 μm and height of about 1.5 μm is formed corresponding to frame interval and frame height. Successively, the resist frame 124 and the NiFe layer 125 excluding the front end portion 126 are removed so as to leave the front end portion 126 (FIGS. 7A and 7B). Then, alumina film 127 of nonmagnetic insulator having a sufficient thickness for burying the front end portion 126 is formed by sputtering method (FIGS. 7C and 7D). Next, resist cover 128 for removing a portion above the front end portion 126 of the alumina film 127 is formed (FIGS. 8A and 8B). At this time, after coating with resist, high temperature treatment of about 130° C. is carried out in next ion beam etching process, so as to get excellent flatness of the alumina film 129 and front end portion 126 after the removal so that end portion of the resist cover 128 is gentled. Then, the alumina film is removed by ion beam etching (FIGS. 8C and 8D). The gentled resist cover 128 retreats with a progress of ion beam etching, so that finally it functions to improve the flatness of the surfaces of the alumina film 129 and front end portion 126.

Figure 9A:
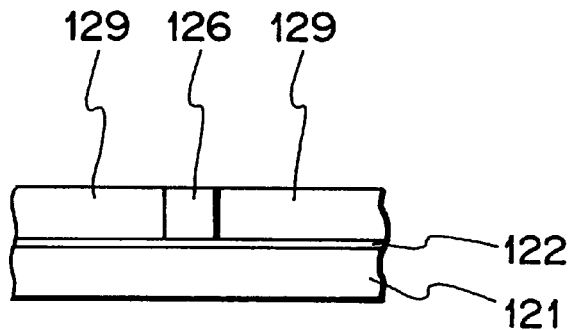
Figure 9B:
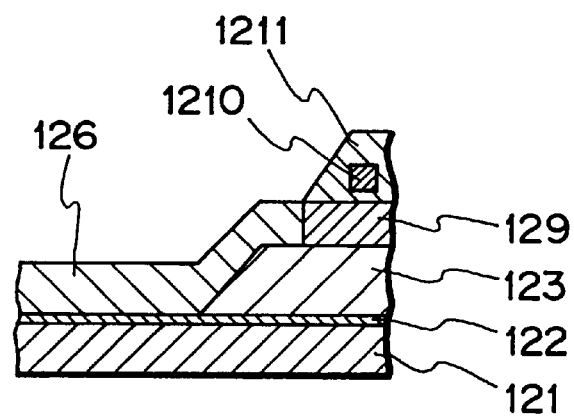
Figure 9C:
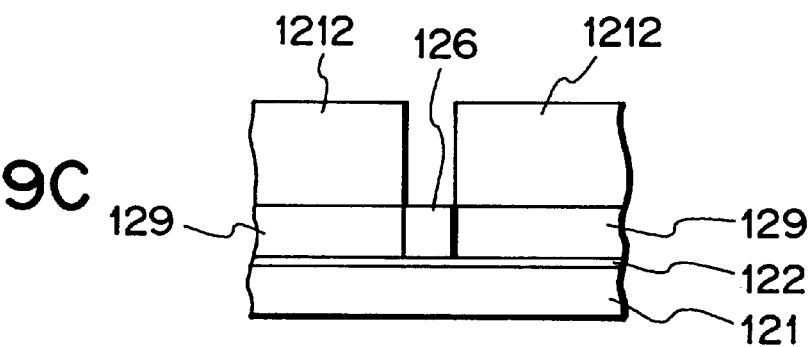
Figure 9D:
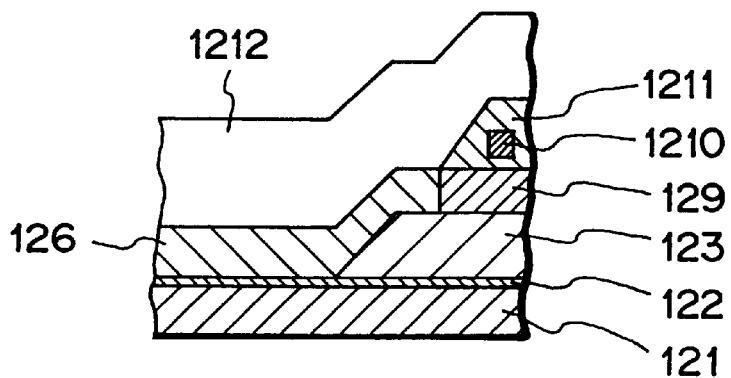
Figure 10A:
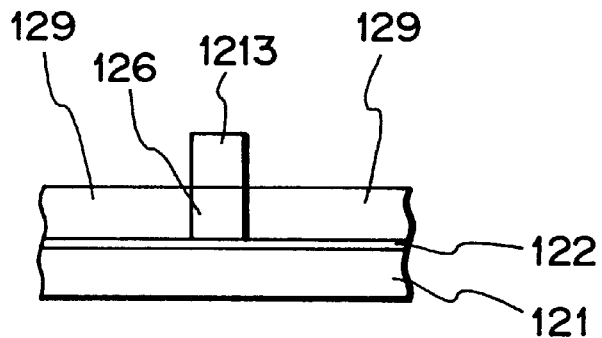
Figure 10B:
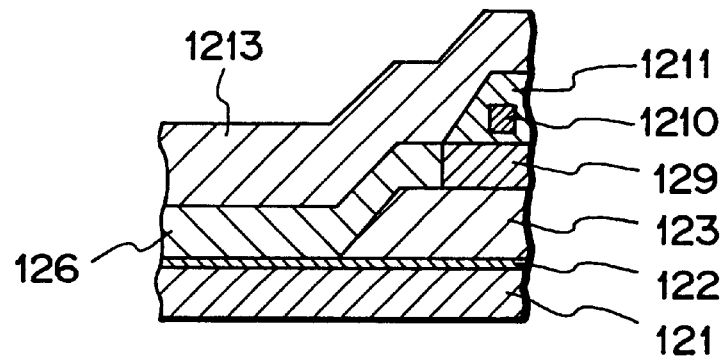
Figure 10C:
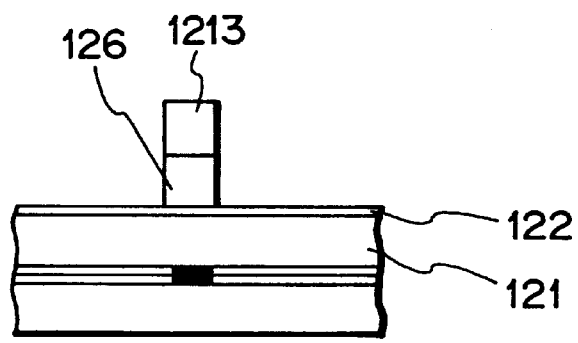
Figure 10D:
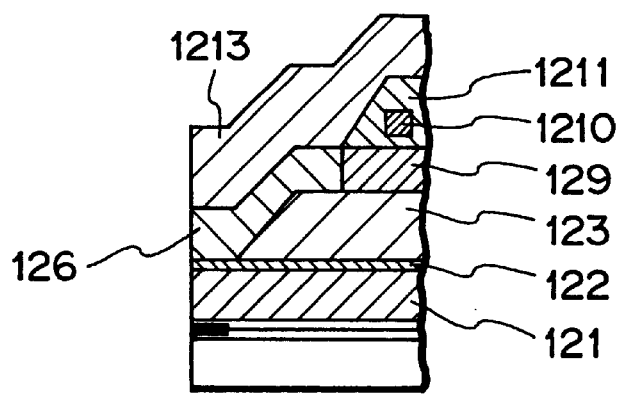
Figure 11:
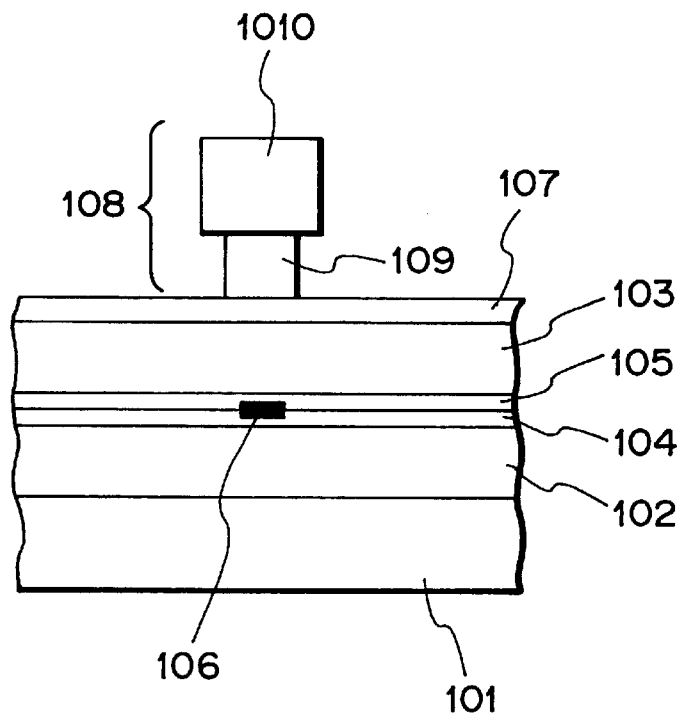
FIG. 11 is a front view taken from the air bearing surface showing an example of the composite head according to the present invention.
Figure 12:
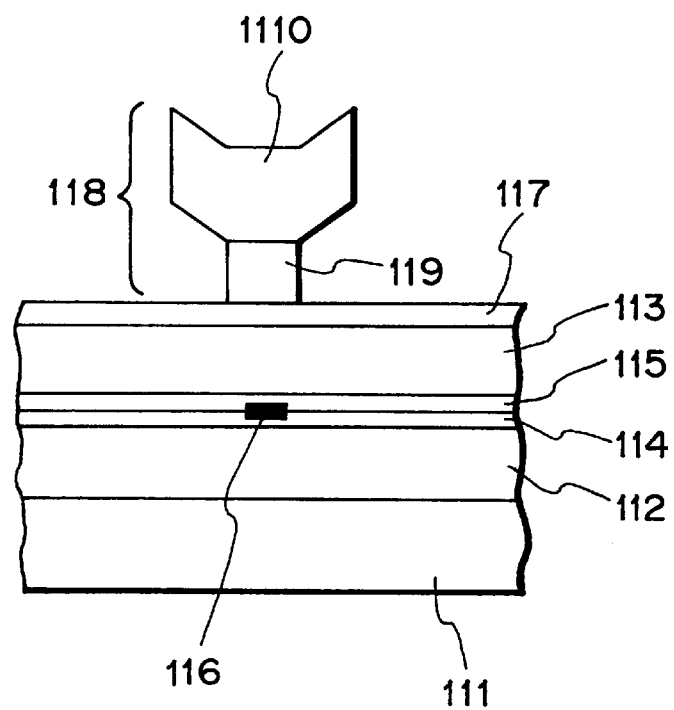
FIG. 12 is a front view taken from the air bearing surface showing an example of the composite head according to the present invention.

Next, coil 1210 covered with photo resist 1211 which is a nonmagnetic insulator is formed (FIGS. 9A and 9B). Then, to form a main body portion 1213 excluding the front end portion 126 of the second magnetic pole, resist frame 1212 properly positioned relative to the front end portion 126 is formed (FIGS. 9C and 9D). Because the step difference by the coil 1210 and the like is larger than that upon forming the aforementioned front end portion 126 at this time, the frame thickness below the step is increased. As a result, resolution of resist is lowered. If the main body portion 1213 which is formed in a step shown in FIGS. 10A and 10B is formed on the front end portion 126 having a smaller width than a specified one, as shown in FIG. 11, the width of the main body portion 1010 placed thereon may be larger than the width of the front end portion 109. In this case, the shape of the main body portion may be that of the main body portion 1110 as shown in FIG. 12 to make it difficult for leaking magnetic flux between both edges (right/left) of the main body portion 1010 extended widely to both sides and the first magnetic pole 103 through the magnetic gap 107 to affect the recording characteristic. In ion beam etching step shown in FIGS. 8C and 8D, by continuing ion beam etching after the alumina film 127 covering the front end portion 126 is removed also, the front end portion 126 having a faster etching speed is etched earlier than the surrounding alumina film 127, so that there is produced a step between the front end portion 126 and alumina film 127, thereby producing the main body portion 1110 having a shape shown in FIG. 12. Completion diagrams of FIGS. 10C and 10D correspond to FIGS. 1, 2.

The magnetic recording apparatus built up using the composite head of the present invention is a magnetic disk apparatus 180 shown in FIG. 5. This head opposes a magnetic medium at the ABS. As for the magnetic characteristic of the medium, its coercive force is 2400 Oe, a product of remnant magnetization Br and magnetic layer thickness is 100 G·μm and magnetic gap between a medium and head ABS is 65 nm. This magnetic recording apparatus carries out high density recording and reproduction of 3 GB per 1 square inch. Further as for the magnetic characteristic, by making its coercive force 2400 Oe, a product of the remnant magnetization Br and magnetic layer thickness 90 G·μm and magnetic gap between the medium and ABS 40 nm, it is possible to improve linear density so that high density recording/reproduction of 4 GB per 1 square inch is achieved.

The MR head portion in the first embodiment is assumed to be MR head using MR effect by anisotropy. The laminated structure of the central region 16 of the MR head shown in FIG. 42 comprises CoZr film (12 nm thick), Ta film (10 nm thick), and NiFe film (12 nm thick), arranged in this order from the lower shield 18. The width of the central region is 1.2 μm, determining reproducing track width. The width of the second magnetic pole 110 determining the recording track width is 1.5 μm. This composite head realizes high density magnetic recording and reproduction of 3 GB per 1 square inch. In this case, sense current density of the MR head needs to be as high as $5 \times 10^7$ A/cm². The production method of this head is the same as the first embodiment.

Figure 13:
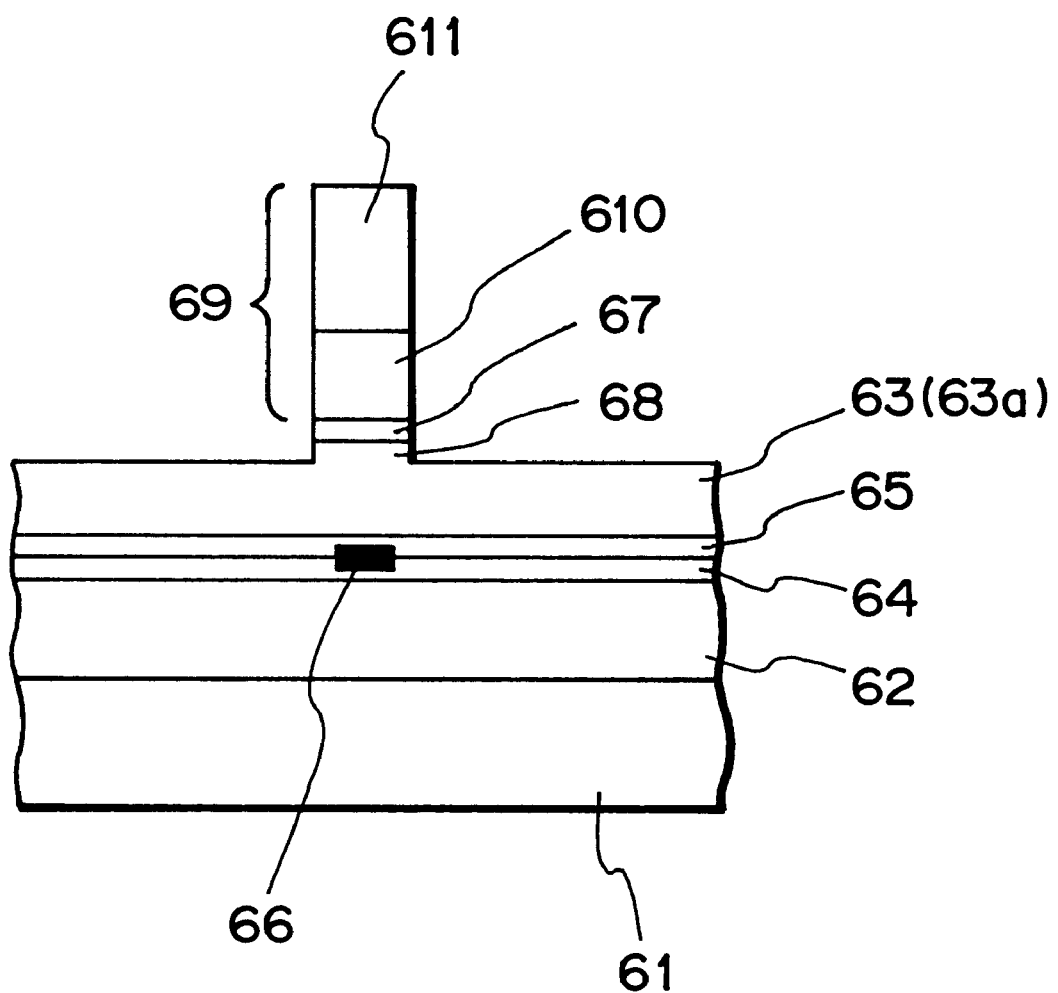
FIG. 13 is a front view taken from the air bearing surface showing a third embodiment of the composite head according to the present invention.

FIG. 13 shows a third embodiment of the present invention, which view is taken from the ABS. A substrate 61 which acts as a slider is composite ceramic essentially consisting of alumina and titan carbide. The MR head having a reading function is formed thereon. This MR head comprises a lower shield 62 made of patterned CoZrTa film, upper shield 63 made of NiFe and MR element 66 interposed therebetween and exists through magnetic separating layers 64 and 65 made of alumina. The thickness of the lower shield 62 is 1.2 μm and the thickness of the upper shield 63 is 2.5 μm except the surface opposing the magnetic gap. Further, the gap between the upper shield 63 and lower shield 62 is 0.2 μm. As shown in FIG. 42, the MR element 66 interposed therebetween comprises the central region 16 sensitive to magnetic field from a recording medium and end portion regions 14, 15 having a function for supplying bias magnetic field and current to this central region 16. This central region 16 is formed of laminated structure having MR effect generally called spin valve effect and comprises bottom Ta film (5 nm thick), NiFe film (8 nm thick), Cu film (2.5 nm thick), NiFe film (3 nm thick) and NiMn film (30 nm thick), arranged in this order from the lower shield 62. The width of the central region 16 is 1.1 μm, determining reproducing track width.

On this MR head is formed ID head having a recording function by using the upper shield 63 as a first magnetic pole 63a. On a portion opposing the magnetic gap of the magnetic pole 63a is formed a third magnetic pole 68 magnetically continuous with the magnetic pole 63a, having a side determining a width of the second magnetic pole 69. The height of this portion is 0.5 μm. In this ID head, the upper shield 63 serves as a first magnetic pole 63a and a nonmagnetic insulator existing through a magnetic gap 67 made of alumina 0.3 μm in thickness determines zero throat height. This nonmagnetic insulator is formed of photo resist, having a thickness of 2 μm. A front end portion 610 of the second magnetic pole 69 is formed, the front end portion being exposed to the ABS opposing the magnetic medium and partly riding over the nonmagnetic insulator deeper than the zero throat height position relative to the ABS surface. The step difference by this front end portion 610 is filled with nonmagnetic insulator which is alumina. The front end portion 610 determines a recording track width of 1.3 μm and the thickness thereof on the ABS is 1.5 μm. Further, Cu coil is formed on the nonmagnetic insulator 412, the Cu coil 414 being covered with nonmagnetic insulator formed of photo resist. Then, a main body 611 is formed so as to ride over this coil and front end portion 610. The thickness of the magnetic pole 69 on the ABS is 3 μm. This composite head realizes high density magnetic recording reproduction of 4 GB per 1 square inch.

Production method of this composite head will be described with reference to FIGS. 14 to 18. FIGS. 14 to 18 show production method for the embodiment of the magnetoresistive effect composite head according to the present invention. In the same Figures, production process of the read head is omitted and only production process of the recording ID head is shown.

Figure 14A:
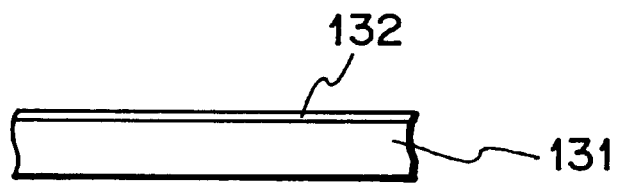
Figure 14B:
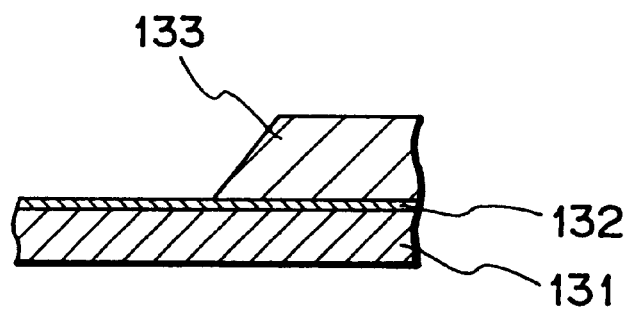
Figure 14C:
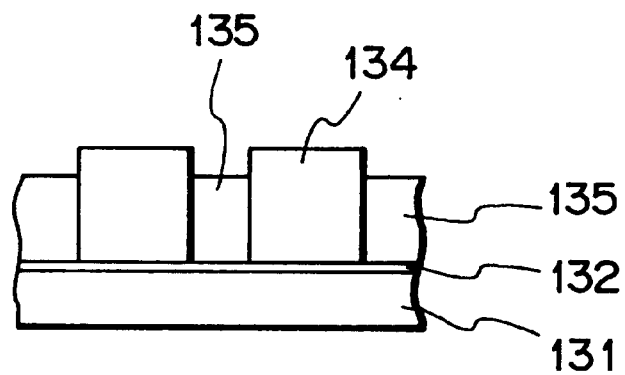
Figure 14D:
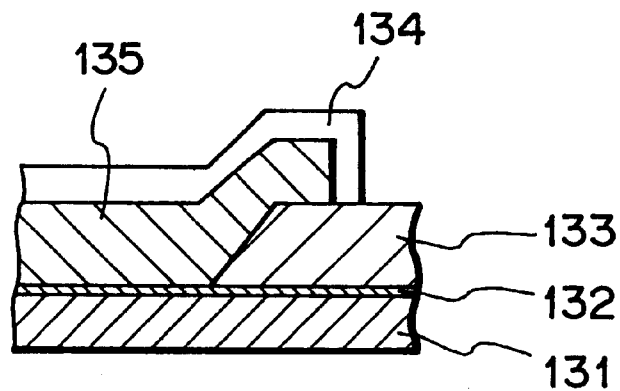
Figure 15A:
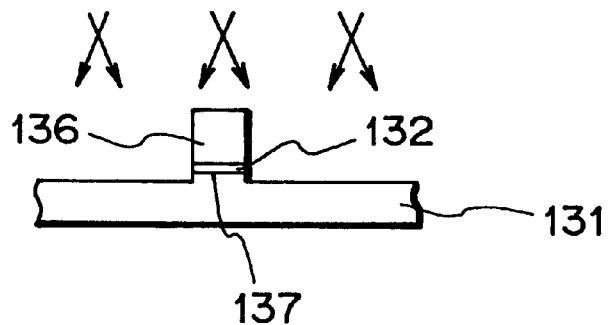
Figure 15B:
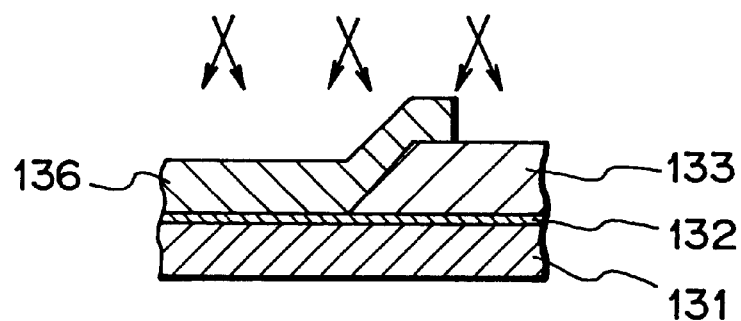
Figure 15C:
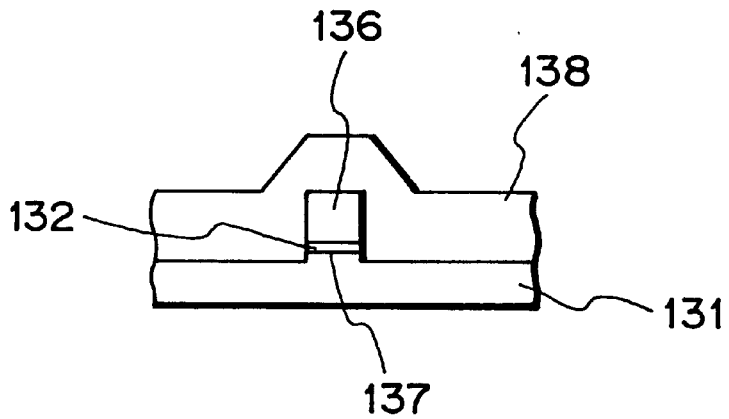
Figure 15D:
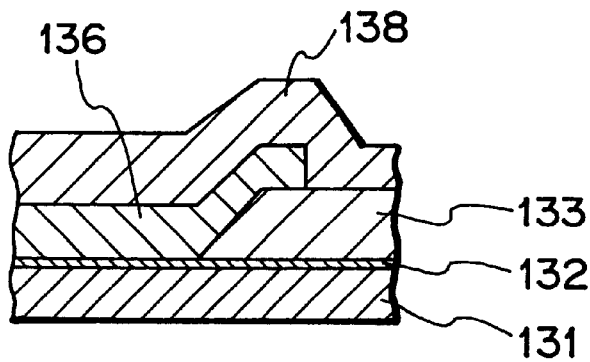
Figure 16A:
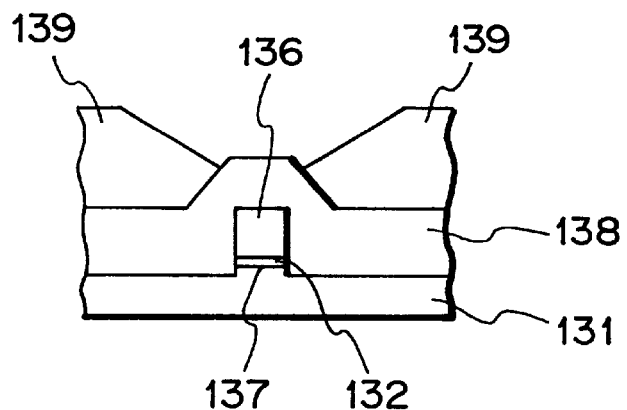
Figure 16B:
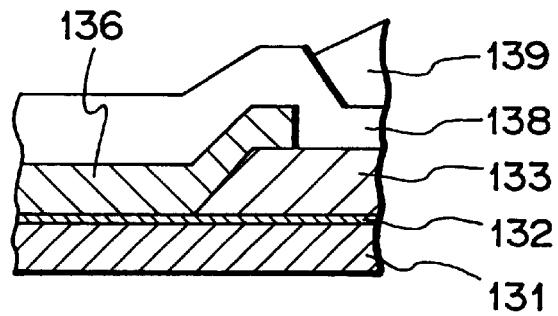
Figure 16C:
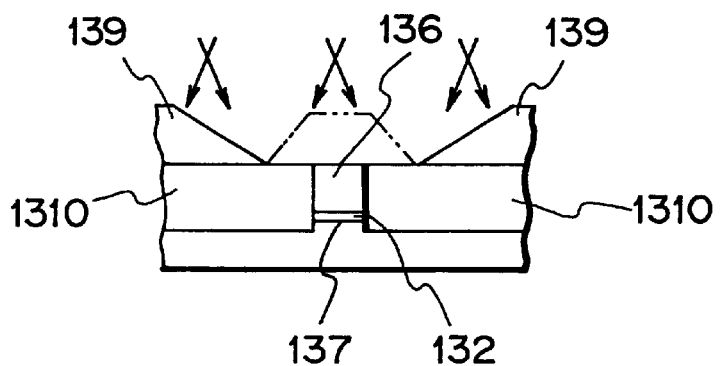
Figure 16D:
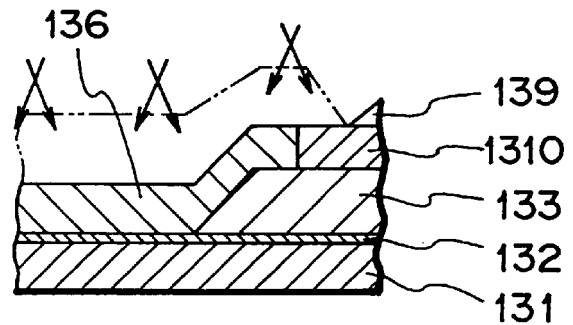

In pole height position defining nonmagnetic insulator forming step, photo resist pattern 133 is formed on a first magnetic pole 131 and magnetic gap 132 at a good precision (FIGS. 14A and 14B). At front end magnetic pole forming step, first a resist frame 134 is formed so as to ride over the magnetic gap 132 and photo resist pattern 133 (FIGS. 14C and 14D). This resist frame 134 encloses space on the photo resist pattern 133. Because the step difference by the photo resist pattern 133 is as high as 2 to 3 μm at this time, the thickness of the resist frame 134 below the step can be about 4 μm, so that a narrow frame interval of 1.3 μm can be realized. After that, a front end portion 136 made of NiFe layer 135 is formed by plating method. The front end portion 136 having a width of about 1.3 μm and height of about 3 μm is formed corresponding to frame interval and frame height. The resist frame 134 and other NiFe 135 than a required magnetic pole are removed and the magnetic gap 132 and magnetic pole 131 are etched by ion beam etching with the front end portion 136 used as a mask. As a result, a third magnetic pole 137 having the same side face as a side face determining a track width of the front end portion 136 is formed (FIGS. 15A and 15B). Next, alumina film 138 which is a nonmagnetic insulator is formed by sputtering so that a sufficient thickness for burying the front end portion 136 is possessed (FIGS. 15C and 15D). Next, resist cover 139 is formed to remove a portion above the front end portion 136a of the alumina film 138 (FIGS. 15C and 15D). At this time, to improve the flatness of the alumina film 1310 and front end portion 136 after the above removal in next ion beam etching step, high temperature treatment at about 130° C. is carried out so as to gentle the resist end portion after coating resist. Next, by ion beam etching, the alumina film 138 is removed (FIGS. 16A and 16B). The gentled resist cover 139 retreats with a progress of ion beam etching, so that finally it functions to improve the flatness of the surfaces of the alumina film 1310 and front end portion 136.

Figure 17A:
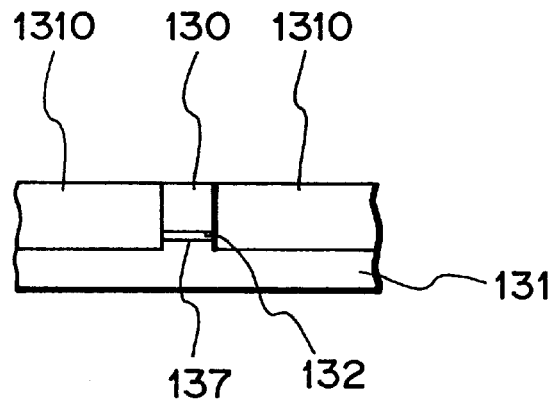
Figure 17B:
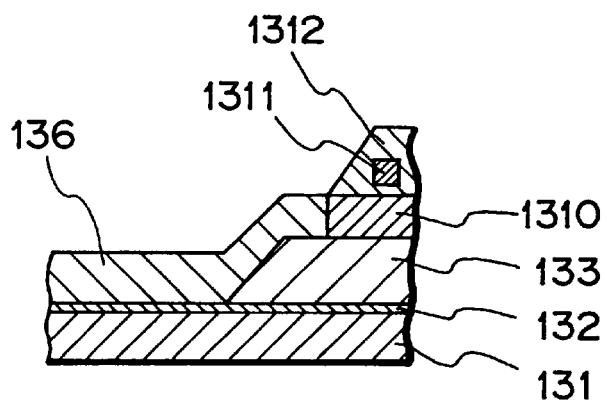
Figure 17C:
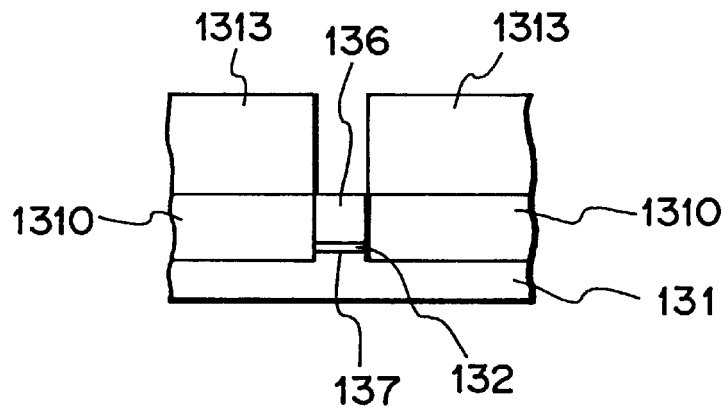
Figure 17D:
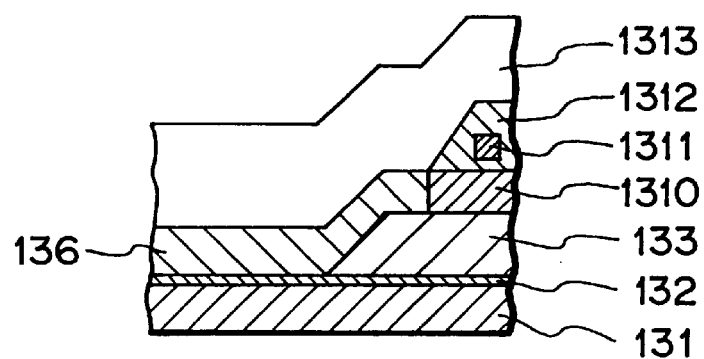
Figure 18A:
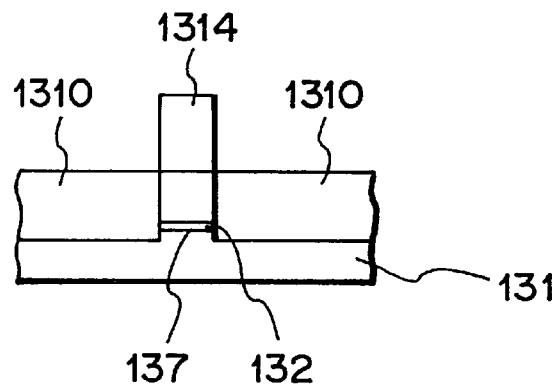
Figure 18B:
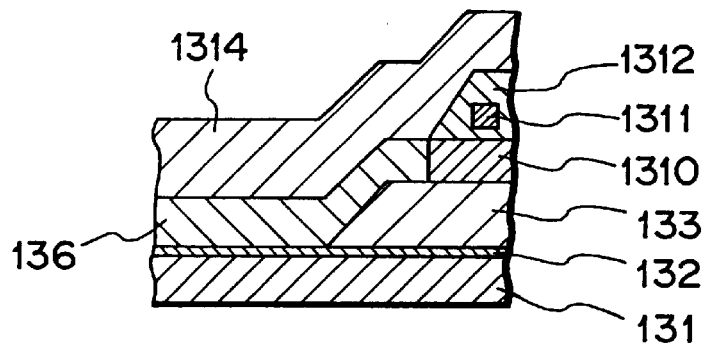
Figure 18C:
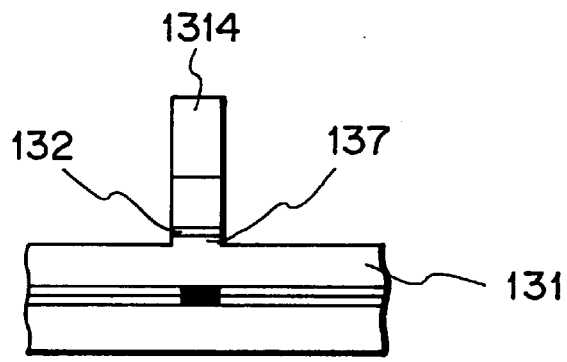
Figure 18D:
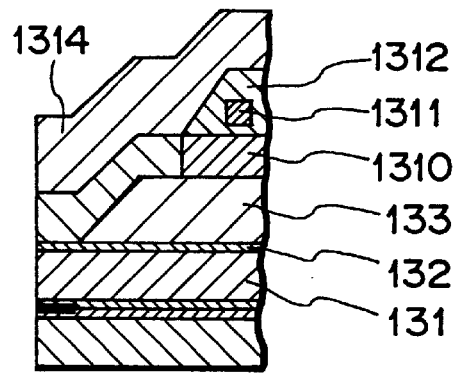

Next, coil 1311 covered with photo resist 1312 of nonmagnetic insulator is formed (FIGS. 17A and 17B). Then, to form a second magnetic pole main body portion 1314, resist frame 1313 properly positioned above the front end portion 136 is formed. Because a difference of step by the coil 1311 and the like is larger than that upon forming the aforementioned front end portion 136, the frame thickness below the step is increased. As a result, resolution of resist is lowered. If the second magnetic pole is formed on the front end portion 136 which is narrower than a predetermined width, as shown in FIG. 11, the width of the main body portion 1010 placed thereon may be larger than the width of the front end portion 109. In this case, the shape of the main body portion may be that of the main body portion 1110 as shown in FIG. 12 to make it difficult for leaking magnetic flux between both edges (right/left) of the main body portion 1010 extended widely to both sides and the first magnetic pole 103 through the magnetic gap 107 to affect the recording characteristic. In alumina ion beam etching step shown in FIGS. 16C and 16D, by continuing ion beam etching after the alumina film covering the front end portion 136 is removed also, the front end portion 136 having a faster etching speed is etched earlier than the surrounding alumina film 138, so that there is produced a step between the front end portion 136 and alumina film 1310, thereby producing the main body portion 1110 having a shape shown in FIG. 12. Completion diagrams of FIGS. 18C and 18D correspond to FIG. 13.

The magnetic recording apparatus built up using the composite head of the present invention is a magnetic disk apparatus 180 shown in FIG. 5. This head opposes a magnetic medium at the ABS. As for the magnetic characteristic of the medium, its coercive force is 2400 Oe, a product of remnant magnetization Br and magnetic layer thickness is 90 G·μm and magnetic gap between a medium and head ABS is 55 nm. This magnetic recording apparatus carries out high density recording and reproduction of 4 GB per 1 square inch. Further as for the magnetic characteristic, by making its coercive force 2400 Oe, a product of the remnant magnetization Br and magnetic layer thickness 80 G·μm and magnetic gap between the medium and ABS 40 nm, it is possible to improve linear density so that high density recording/reproduction of 5 GB per 1 square inch is achieved.

Figure 3:
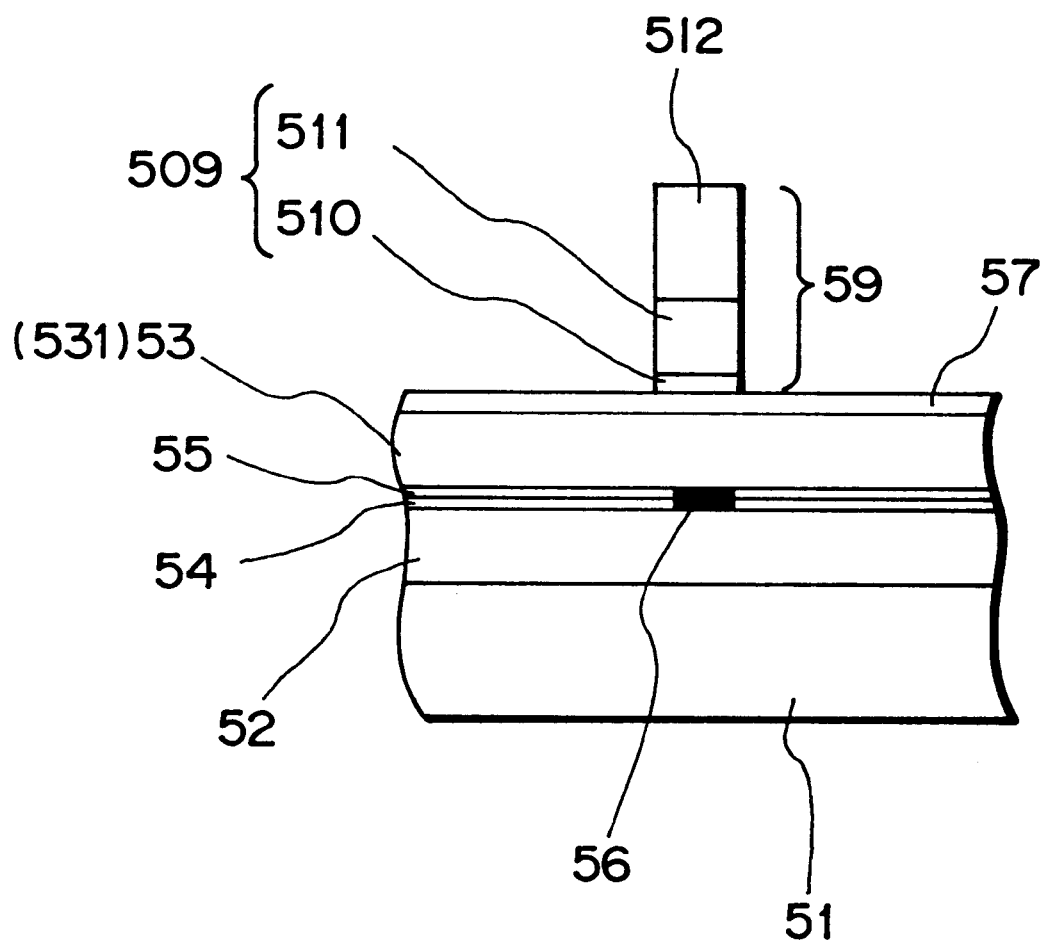
FIG. 3 is a front view taken from the air bearing surface showing a fourth embodiment of the composite head according to the present invention.
Figure 4:
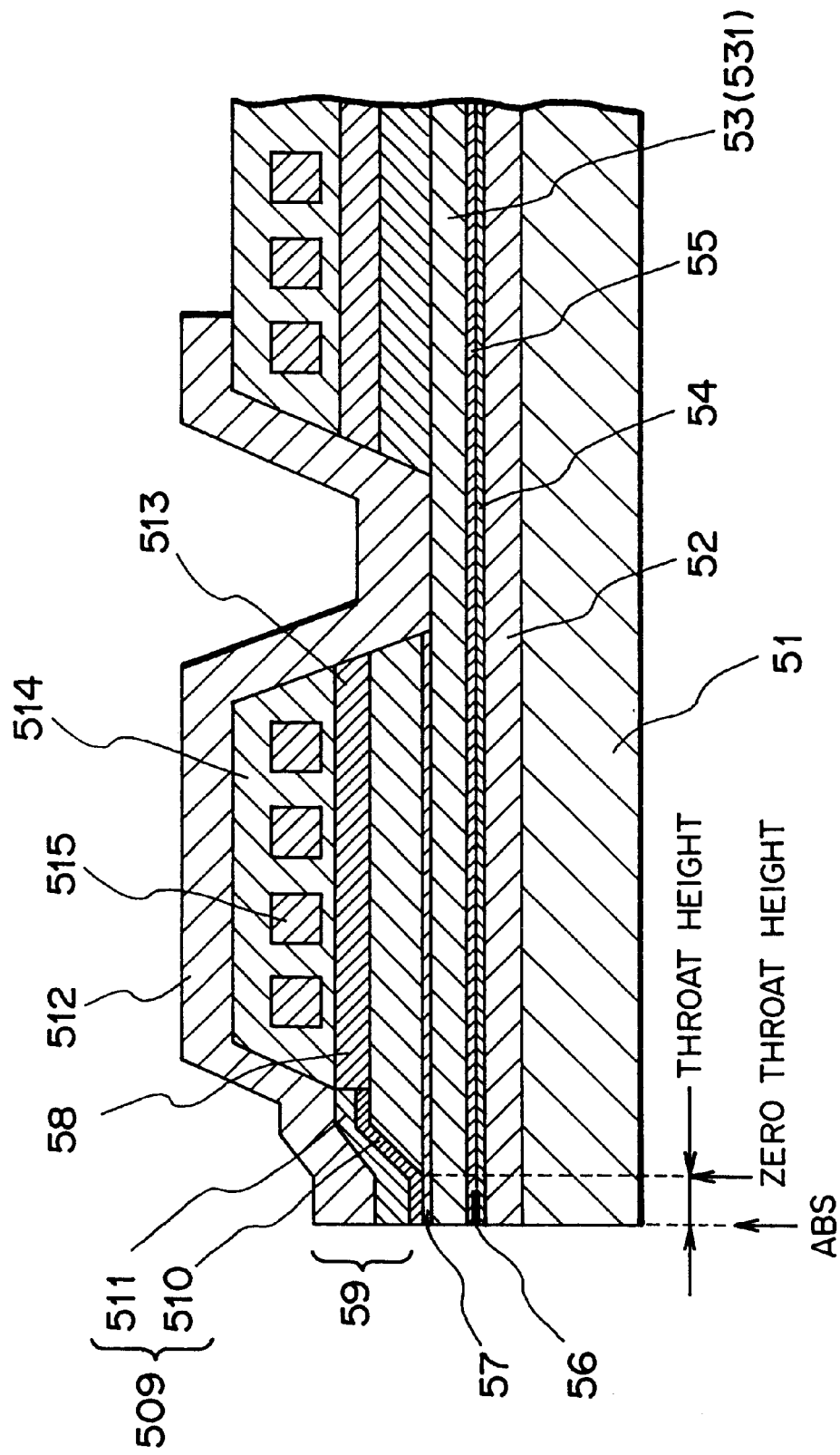
FIG. 4 is a sectional view perpendicular to the air bearing surface showing a fourth embodiment of the composite head according to the present invention.

FIGS. 3, 4 show a fourth embodiment of the present invention while FIG. 3 is a view taken from ABS and FIG. 4 is a sectional view taken perpendicular to the ABS. A substrate 51 acting as a slider is composite ceramic composed of alumina and titan carbide. MR head having a reading function is formed thereon. This MR head comprises a lower shield 52 made of patterned CoZrTa film, upper shield 53 made of NiFe film, and MR element which is interposed therebetween and exists through magnetic separating layers. The thickness of the lower shield 52 is 1 μm and the thickness of the upper shield 53 is 3 μm. There is a gap of 0.19 μn between the upper shield 53 and lower shield 52. As shown in FIG. 42, the MR element existing in this gap comprises a central region 16 sensitive to magnetic field of a recording medium and end portion regions 14, 15 having a function for supplying bias magnetic field and current to this central region. This central region 16 is formed of a laminated structure having MR effect generally called spin valve effect and concretely contains bottom Ta film (film thickness 5 nm), NiFe film (film thickness, 8 nm), Cu film (film thickness, 2.5 nm), CoFe film (film thickness, 3 nm), and PtMn film (film thickness, 20 nm), which are arranged in this order from the lower shield 52. The central region 16 has a width of 1 μm, determining reproducing track width.

On this MR head is formed ID head having a recording function by using the upper shield 53 as a first magnetic pole P1. In this ID head, the upper shield 53 serves as a first magnetic pole 531 and a nonmagnetic insulator 58 existing through a magnetic gap 57 made of alumina 0.3 μm in thickness formed on the magnetic pole 531 determines zero throat height. This nonmagnetic insulator 58 is formed of photo resist, having a thickness of 1.5 μm. Further, a front end portion 509 of a second magnetic pole 59 is formed, the front end portion 509 being exposed to the ABS opposing the magnetic medium and partly riding over the nonmagnetic insulator 58. This front end portion 509 comprises CoTaZr film 510 having a large saturated magnetization and NiFe film 511, which are arranged in this order from the magnetic gap 57, while the thicknesses thereof are 0.5 μm, 1.5 μm. A step difference produced by this front end portion 509 is filled with nonmagnetic insulator 513. The front end portion 509 determines a recording track width of 1.2 μm. Further, Cu coil 515 is formed on the nonmagnetic insulator 514, the Cu coil 515 being covered with nonmagnetic insulator 514 formed of photo resist. Then, a main body 512 of the second magnetic pole 59 is formed so as to ride over the coil 515 and front end portion 509. The thickness of the magnetic pole 59 on the ABS is 3 μm. This composite head realizes high density magnetic recording reproduction of 5 GB per 1 square inch.

Production method of this composite head will be described with reference to FIGS. 19 to 23. FIGS. 19 to 23 show production method for the embodiment of the magnetoresistive effect composite head according to the present invention. In the same Figures, production process of the read head is omitted and only production process of the recording ID head is shown.

Figure 19A:
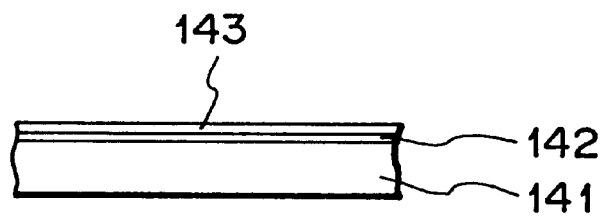
Figure 19B:
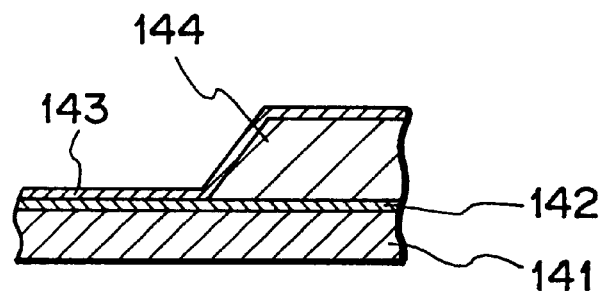
Figure 19C:
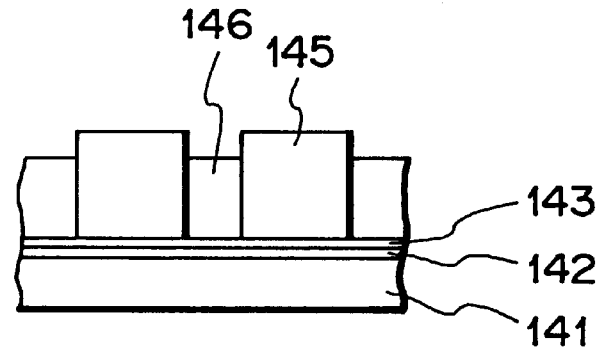
Figure 19D:
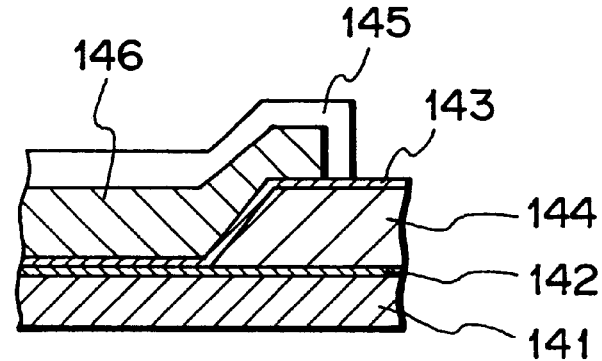
Figure 20A:
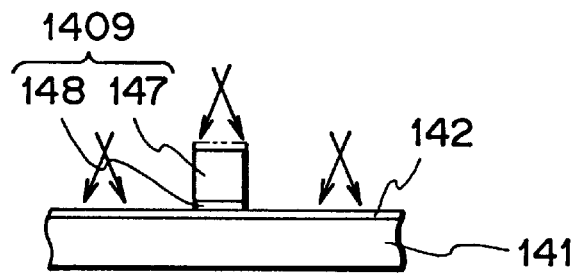
Figure 20B:
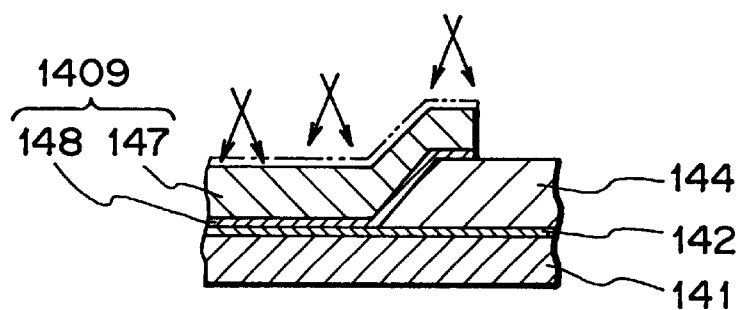
Figure 20C:
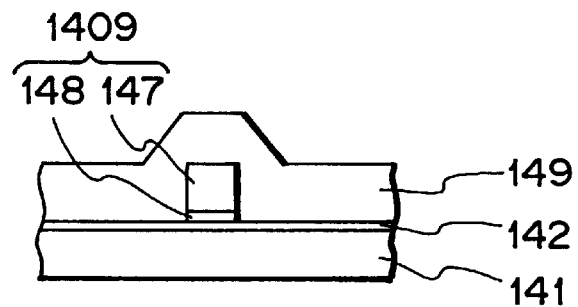
Figure 20D:
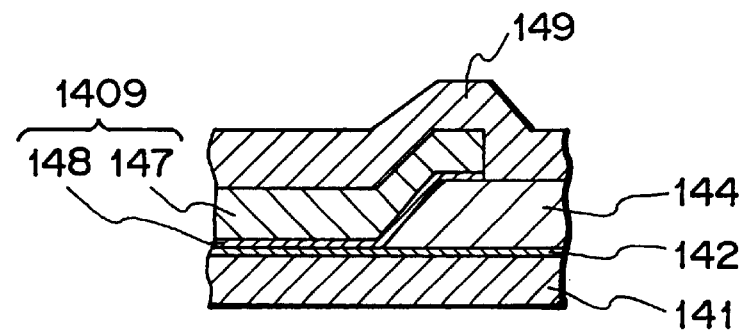
Figure 21A:
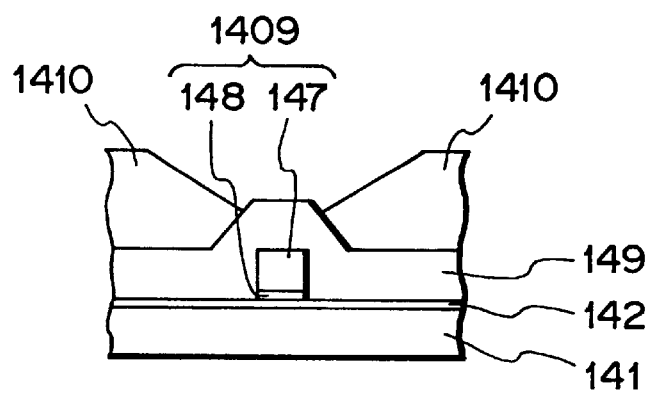
Figure 21B:
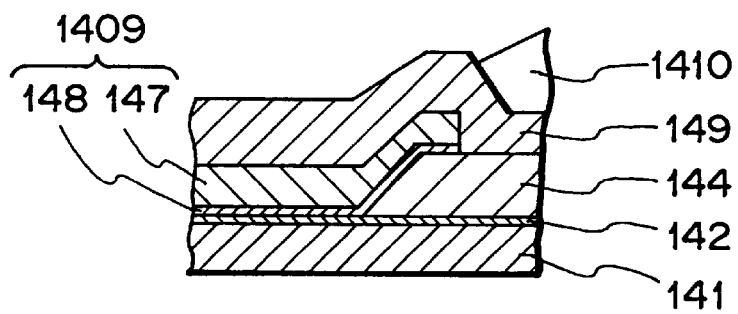
Figure 21C:
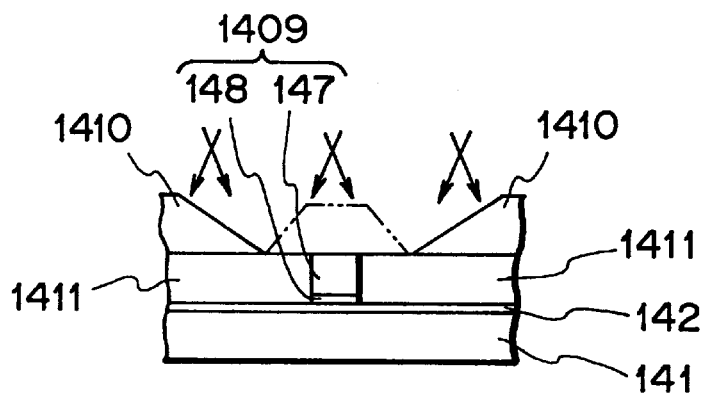
Figure 21D:
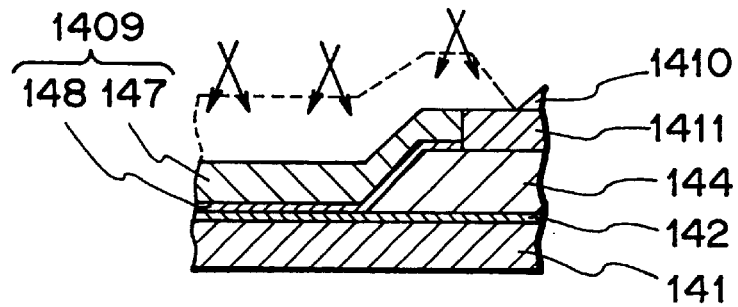

In pole height position defining nonmagnetic insulator forming step, photo resist pattern 144 is formed on a first magnetic pole 141, magnetic gap 142 and CoTaZr film 143 at a good precision (FIGS. 19A and 19B). At front end magnetic pole forming step, first a resist frame 145 is formed so as to ride over the photo resist pattern 144 (FIGS. 19C and 19D). This resist frame 145 encloses space on the photo resist pattern 144. At this time, because a step by the photo resist pattern 144 is as high as 2 to 3 μm, the width of the resist frame 145 below the step can be about 4 μm, so that a small frame interval width of 1.2 μm can be formed. After that, a front end portion 1409 made of NiFe 146 is formed by plating method. The front end portion 1409 having a width of about 1.2 μm and height of about 3 μm is formed corresponding to frame interval and frame height (FIGS. 20A and 20B). Successively, the resist frame 145 and unnecessary NiFe layer 146 are removed. With the NiFe 146 of the front end portion as a mask, the CoTazr film 143 is etched by ion beam etching so as to produce a magnetic pole 148 having a side face determining the same track width as the NiFe magnetic pole 147. Then, alumina film 149 of nonmagnetic insulator having a sufficient thickness for burying the front end portion 1409 is formed by sputtering method (FIGS. 20C and 20D). Next, resist cover 1410 for removing a portion above the front end portion 1409 of the alumina film 149 is formed (FIGS. 21A and 21B). At this time, after coating with resist, high temperature treatment of about 130° C. is carried out in next ion beam etching process, so as to get excellent flatness of the alumina film 1411 and front end portion 1409 after the removal so that the end portion of the resist cover is gentled. Then, the alumina film is removed by ion beam etching (FIGS. 21C and 21D). The gentled resist mask retreats with a progress of ion beam etching, so that finally it functions to improve the flatness of the surfaces of the alumina film 1411 and front end portion 1409.

Figure 22A:
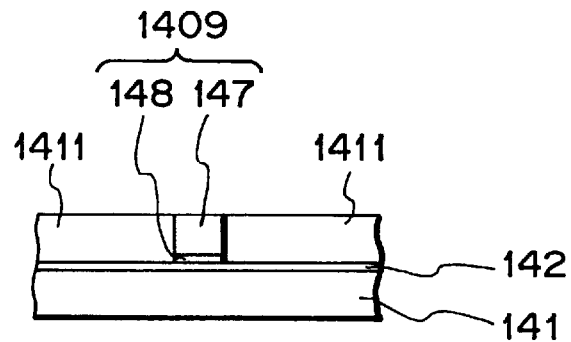
Figure 22B:
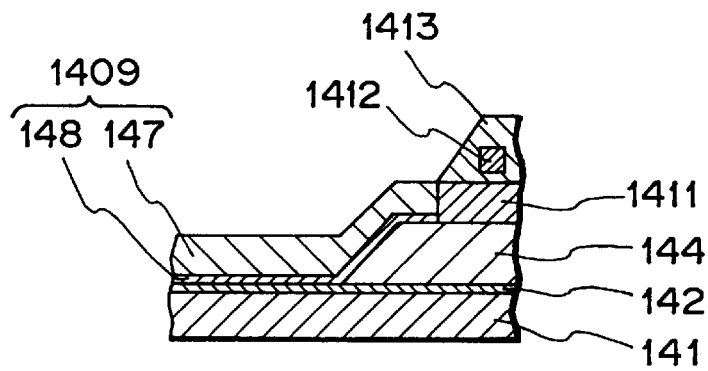
Figure 22C:
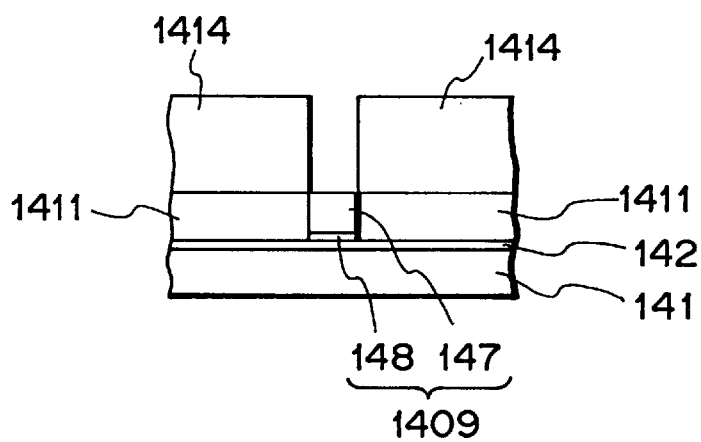
Figure 22D:
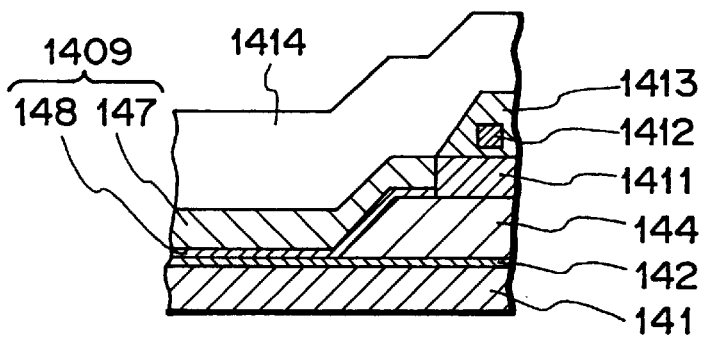
Figure 23A:
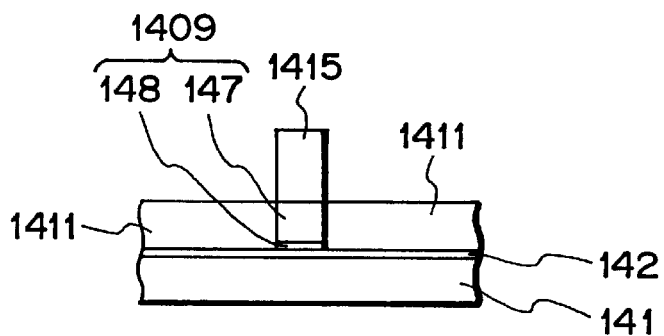
Figure 23B:
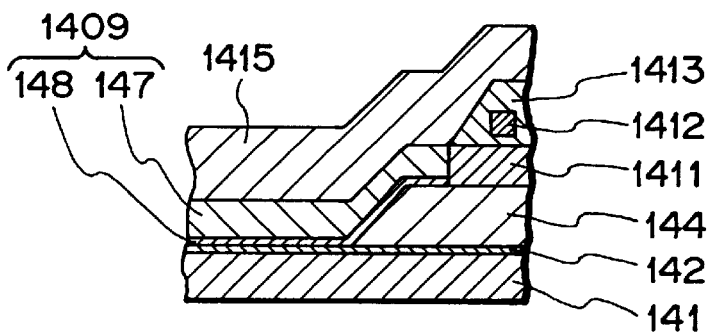
Figure 23C:
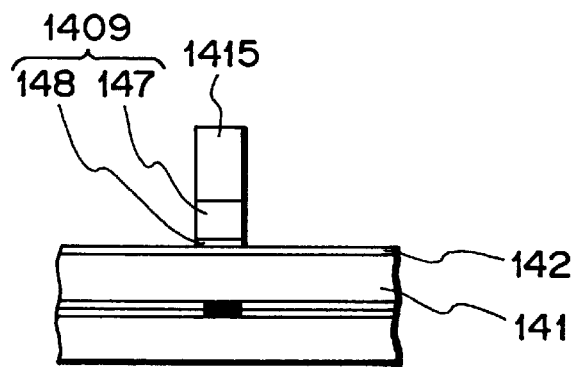
Figure 23D:
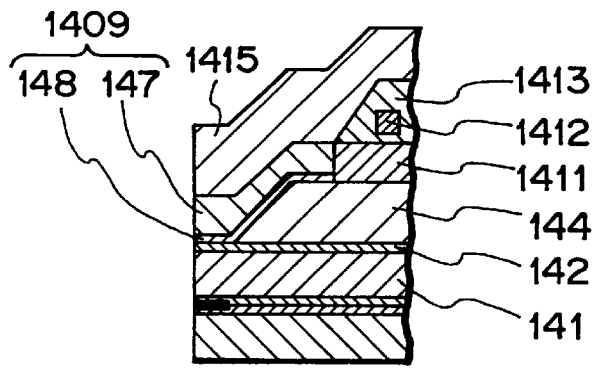

Next, coil 1412 covered with photo resist 1413 which is a nonmagnetic insulator is formed (FIGS. 22A and 22B). Then, to form a main body portion 1415 of the second magnetic pole, resist frame 1414 properly positioned relative to the front end portion 1409 is formed (FIGS. 22C and 22D). Because a step difference by the coil portion and the like is larger than the step difference caused upon forming the front end portion 1409, the thickness of the frame below the step is increased. As a result, resolution of resist is lowered. If the second magnetic pole formed in steps shown in FIGS. 23A and 23B is formed on the front end portion 1409 having a smaller width than a specified one, as shown in FIG. 11, the width of the main body portion 1010 placed thereon may be larger than the width of the front end portion 109. In this case, the shape of the main body portion may be that of the main body portion 1110 as shown in FIG. 12 to make it difficult for leaking magnetic flux between both edges (right/left) of the main body portion 1010 extended widely to both sides and one magnetic pole through the magnetic gap to affect the recording characteristic. In ion beam etching step shown in FIGS. 21C and 21D, by continuing ion beam etching after the alumina film 149 covering the front end portion 1409 is removed also, the front end portion 1409 having a faster etching speed is etched earlier than the surrounding alumina film 149, so that there is produced a step between the front end portion 1409 and alumina film 1411, thereby producing the main body portion 1110 having a shape shown in FIG. 12. Completion diagrams of FIGS. 23C and 23D correspond to FIGS. 3, 4.

The magnetic recording apparatus built up using the composite head of the present invention is a magnetic disk apparatus 180 shown in FIG. 5. This head opposes a magnetic medium at the ABS. As for the magnetic characteristic of the medium, its coercive force is 2400 Oe, a product of remnant magnetization Br and magnetic layer thickness is 80 G·μm and magnetic gap between a medium and head ABS is 50 nm. This magnetic recording apparatus carries out high density recording and reproduction of 5 GB per 1 square inch. Further as for the magnetic characteristic, by making its coercive force 2400 Oe, a product of the remnant magnetization Br and magnetic layer thickness 80 G·μm and magnetic gap between the medium and ABS 40 nm, it is possible to improve linear density so that high density recording/reproduction of 6 GB per 1 square inch is achieved.

Figure 24:
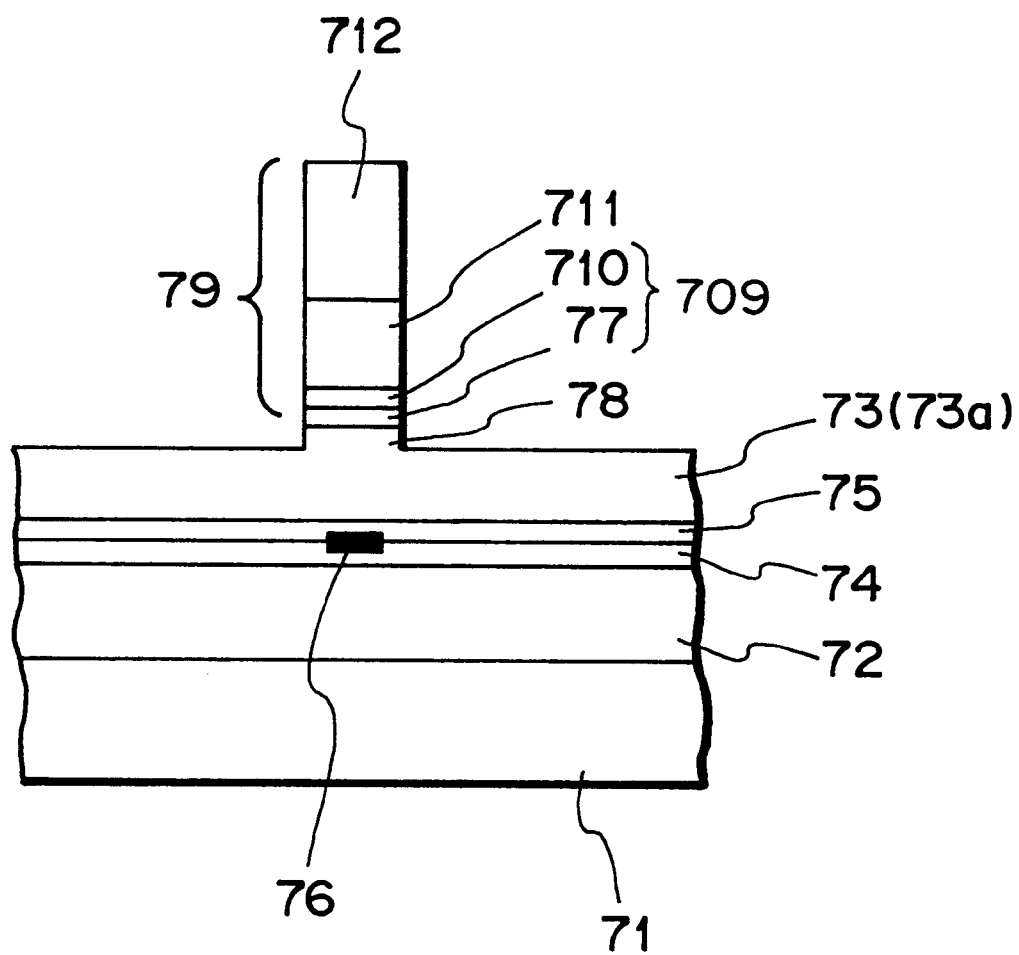
FIG. 24 is a front view taken from the air bearing surface showing the fifth embodiment of the composite head according to the present invention.

FIG. 24 shows a fifth embodiment of the present invention, which view is taken from the ABS. A substrate 71 which acts as a slider is composite ceramic essentially consisting of alumina and titan carbide. The MR head having a reading function is formed thereon. This MR head comprises a lower shield 72 made of patterned CoZrTa film, upper shield 73 made of NiFe and MR element 76 interposed therebetween and exists through magnetic separating layers 64 and 65 made of alumina. The thickness of the lower shield 72 is 1 μm and the thickness of the upper shield 73 is 2.5 μm except the surface opposing the magnetic gap 77. Further, the gap between the upper shield 73 and lower shield 72 is 0.19 μm. As shown in FIG. 42, the MR element 76 interposed therebetween comprises the central region 16 sensitive to magnetic field from a recording medium and end portion regions 14, 15 having a function for supplying bias magnetic field and current to this central region 16. This central region 16 is formed of laminated structure having MR effect generally called spin valve effect and comprises bottom Ta film (5 nm thick), NiFe film (8 nm thick), Cu film (2.5 nm thick), CoFe film (3 nm thick) and PtMn film (20 nm thick), arranged in this order from the lower shield 72. The width of the central region 16 is 0.8 μm, determining reproducing track width.

On this MR head is formed ID head having a recording function by using the upper shield 73 as a first magnetic pole 73a. On a portion opposing the magnetic gap of the magnetic pole 73a is formed a third magnetic pole 78 magnetically continuous with the magnetic pole 73a, having a side coinciding with a side determining a width of the second magnetic pole 79. The height of this portion is 0.5 μm. In this ID head, the upper shield 73 serves as a first magnetic pole 73a and a nonmagnetic insulator existing through a magnetic gap 77 made of alumina 0.3 μm in thickness determines zero throat height. This nonmagnetic insulator is formed of photo resist, having a thickness of 1.5 μm. A front end portion 709 of the second magnetic pole 79 is formed, the front end portion being exposed to the ABS opposing the magnetic medium and partly riding over the nonmagnetic insulator. This front end portion 709 comprises laminated layers of CoTazr film 710 and NiFe film 711 having a large saturated magnetization while the thicknesses thereof are 0.5 μm and 1.5 μm respectively. The step difference by this front end portion 709 is filled with nonmagnetic insulator which is alumina. The front end portion 709 determines a recording track width of 1 μm. Further, Cu coil is formed on the nonmagnetic insulator, the Cu coil being covered with nonmagnetic insulator formed of photo resist. Then, a main body 712 of the second magnetic pole 79 is formed so as to ride over this coil and front end portion 409. The thickness of the magnetic pole 79 at the ABS is 3 μm. This composite head realizes high density magnetic recording reproduction of 6 GB per 1 square inch.

Production method of this composite head will be described with reference to FIGS. 25 to 29. FIGS. 25 to 29 show production method for the embodiment of the magnetoresistive effect composite head according to the present invention. In the same Figures, production process of the read head is omitted and only production process of the recording ID head is shown.

Figure 25A:
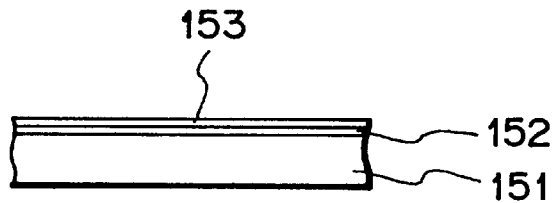
Figure 25B:
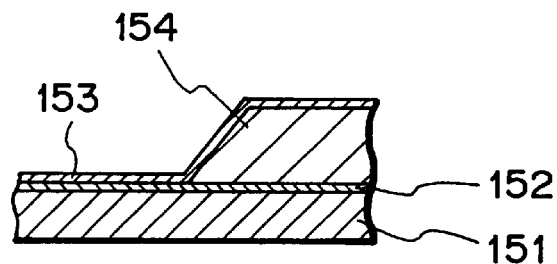
Figure 25C:
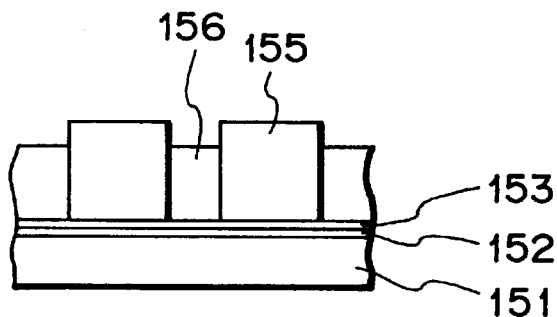
Figure 25D:
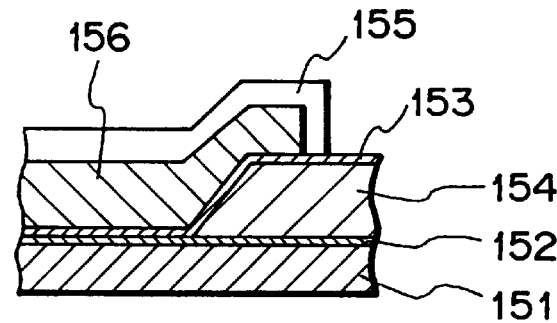
Figure 26A:
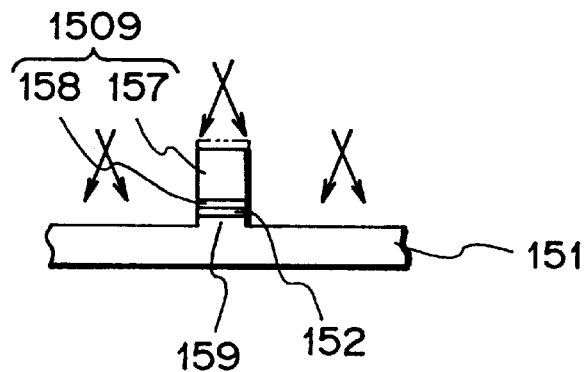
Figure 26B:
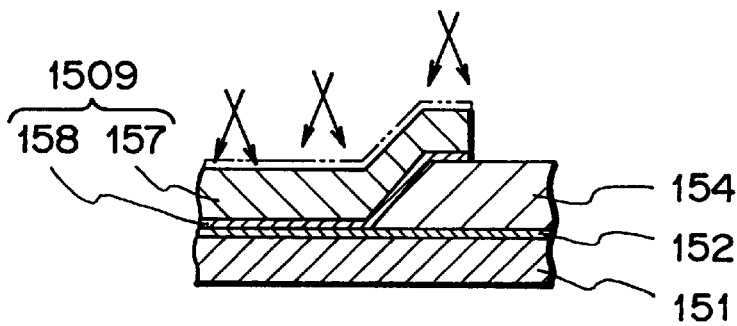
Figure 26C:
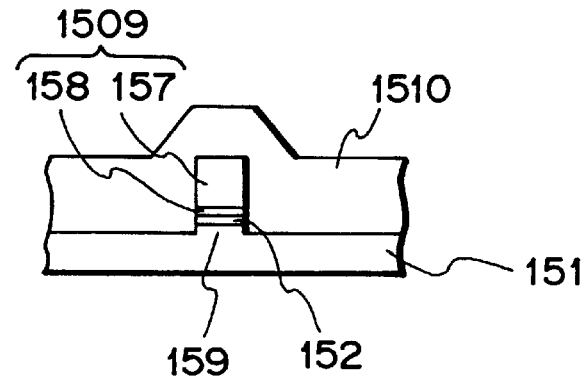
Figure 26D:
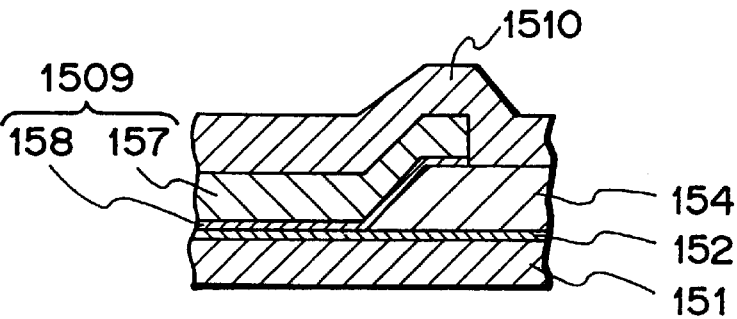
Figure 27A:
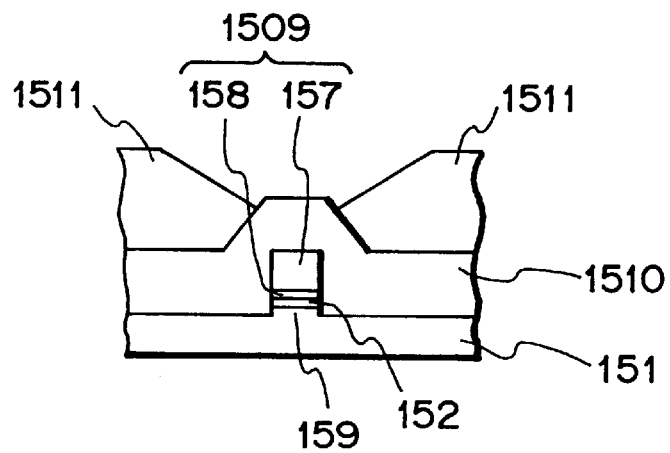
Figure 27B:
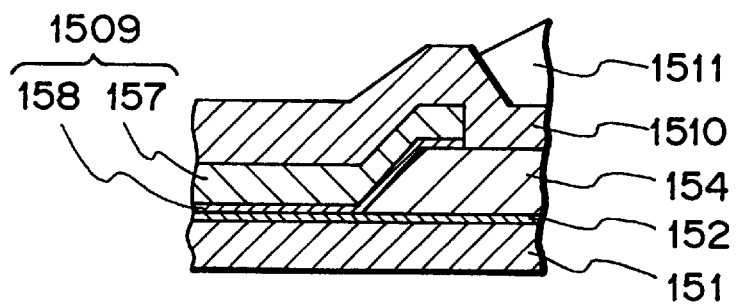
Figure 27C:
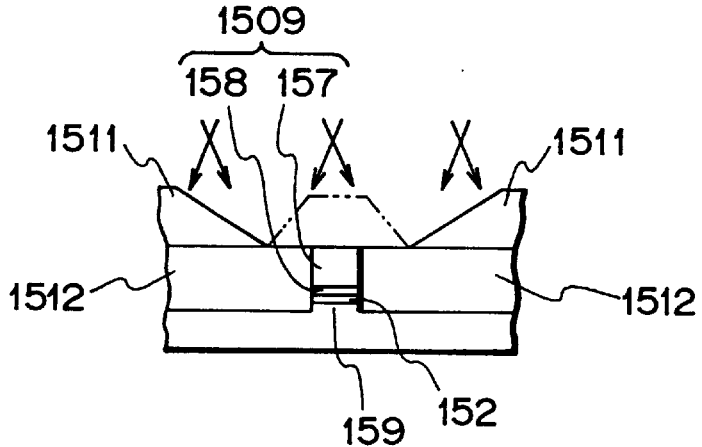
Figure 27D:
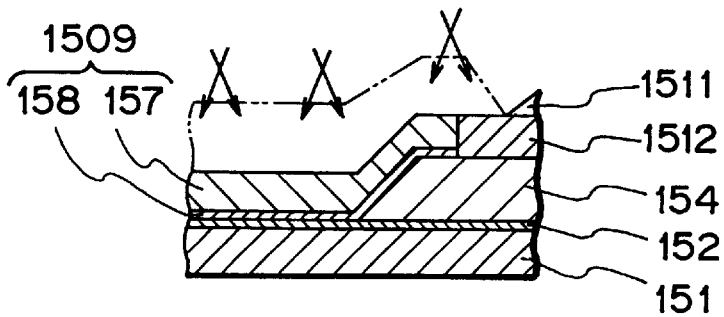

In pole height position defining nonmagnetic insulator forming step, photo resist pattern 154 is formed on a first magnetic pole 151, magnetic gap 152 and CoTaZr film 153 at a good precision (FIGS. 25A and 25B). At front end magnetic pole forming step, first a resist frame 155 is formed so as to ride over the photo resist pattern 154 (FIGS. 25C and 25D). This resist frame 155 encloses space on the photo resist pattern 154. At this time, because a step difference of the photo resist pattern 154 is as high as 2–3 μm, the thickness of the frame below the step can be about 4 μm. Thus, a small frame interval width of 1 μm can be realized. After that, a front end portion 1509 made of NiFe layer 156 is formed by plating method. The front end portion 1509 having a width of about 1 μm and height of about 3.5 μm is formed corresponding to frame interval and frame height. Next, the resist frame 155 and unnecessary NiFe 156 are removed and then with the NiFe of the front end portion 1509 as a mask, the CoTaZr film 153, magnetic gap 152 and first magnetic pole 151 are etched by ion beam etching so as to produce a third magnetic pole 159 having a side determining the same track width as the NiFe magnetic pole 157 (FIGS. 26A and 26B). Next, alumina film 1510 which is a nonmagnetic insulator is formed by sputtering so that a sufficient thickness for burying the front end portion 1509 is possessed (FIGS. 26C and 26D). Then, resist cover 1511 for removing an alumina film 1510 on the front end portion 1509 is formed (FIGS. 27A and 27B). At this time, to improve the flatness of the alumina film 1512 and front end portion 1509 after the above removal in next ion beam etching step, high temperature treatment at about 130° C. is carried out so as to gentle the resist end portion after coating resist. Next, by ion beam etching, the alumina film 1510 is removed (FIGS. 27C and 27D). The gentled resist mask retreats with a progress of ion beam etching, so that finally it functions to improve the flatness of the surfaces of the alumina film 1510 and front end portion 1509.

Figure 28A:
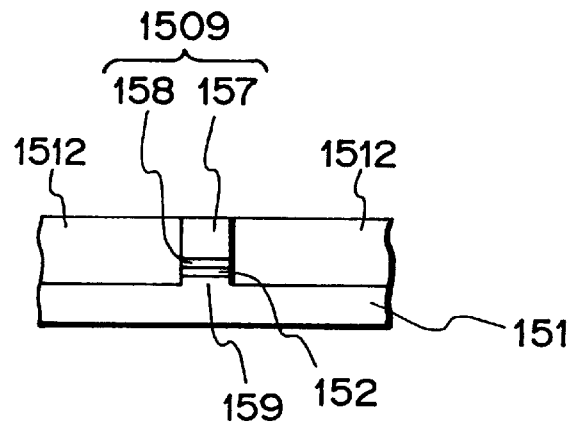
Figure 28B:
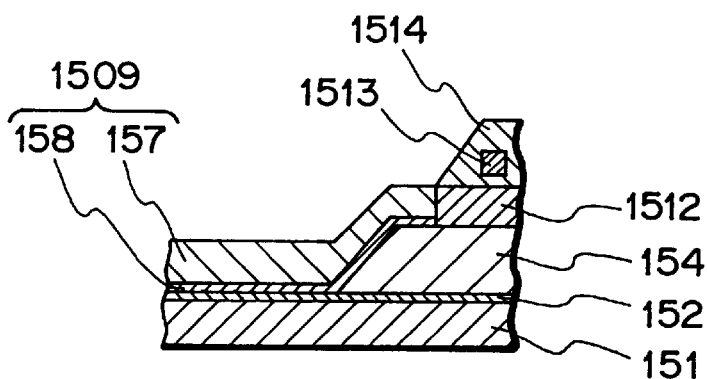
Figure 28C:
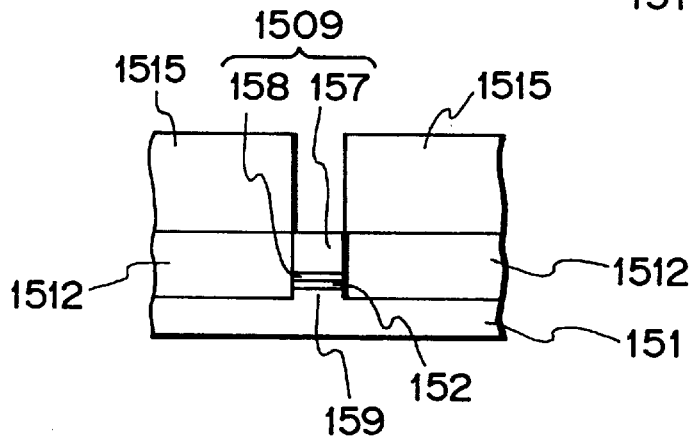
Figure 28D:
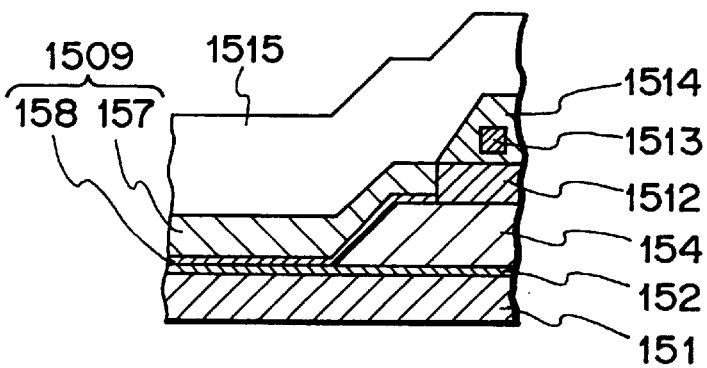
Figure 29A:
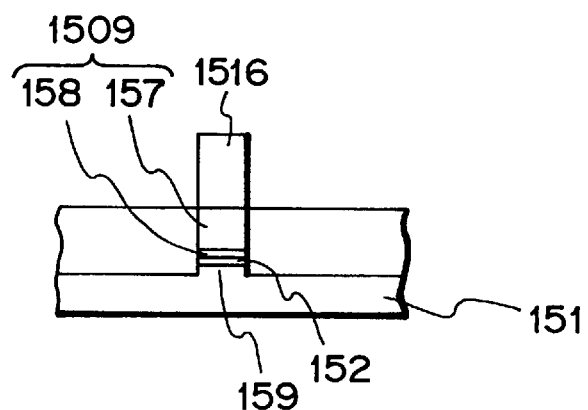
Figure 29B:
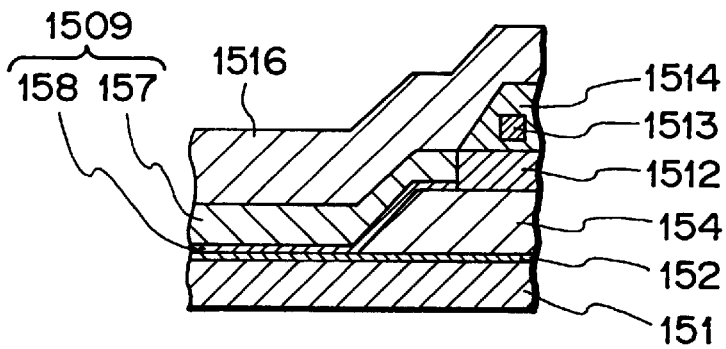
Figure 29C:
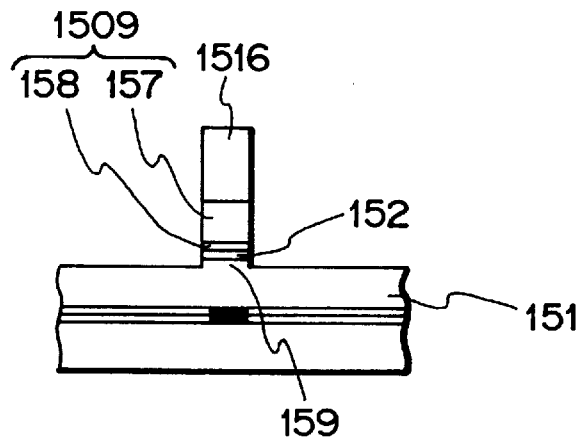
Figure 29D:
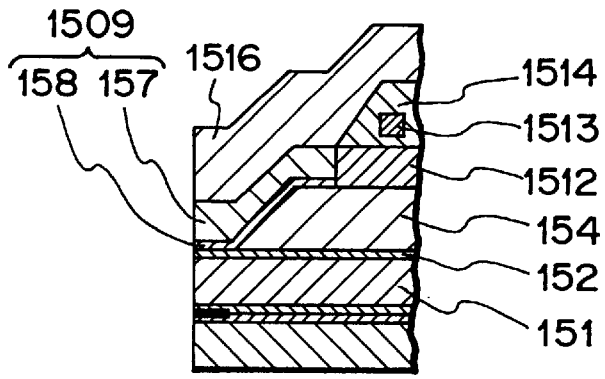

Next, coil 1513 covered with photo resist 1514 of nonmagnetic insulator is formed (FIGS. 28A and 28B). Then, to form a second magnetic pole main body portion 1516, resist frame 1515 properly positioned above the front end portion 1509 is formed (FIGS. 28C and 28D). Because a difference of step by the coil 1513 and the like is larger than that upon forming the aforementioned front end portion 1509, frame thickness below the step is increased. As a result, resolution of resist is lowered. As for the main body portion 1516 formed in FIGS. 29A and 29B, if a narrower front end portion 1509 than a predetermined width is formed, as shown in FIG. 11, the width of the main body portion 1010 placed thereon may be larger than the width of the front end portion 109. In this case, the shape of the main body portion may be that of the main body portion 1110 as shown in FIG. 12 to make it difficult for leaking magnetic flux between both edges (right/left) of the main body portion 1010 extended widely to both sides and the first magnetic pole 103 through the magnetic gap 107 to affect the recording characteristic. In alumina ion beam etching step shown in FIGS. 27C and 27D, by continuing ion beam etching after the alumina film 1510 covering the front end portion 1509 is removed also, the front end portion 1509 having a faster etching speed is etched earlier than the surrounding alumina film 1510, so that there is produced a step between the front end portion 1509 and alumina film 1512, thereby producing the main body portion 1110 having a shape shown in FIG. 12. Completion diagrams of FIGS. 29C and 29D correspond to FIG. 24.

The magnetic recording apparatus built up using the composite head of the present invention is a magnetic disk apparatus 180 shown in FIG. 5. This head opposes a magnetic medium at the ABS. As for the magnetic characteristic of the medium, its coercive force is 2400 Oe, a product of remnant magnetization Br and magnetic layer thickness is 80 G·μm and magnetic gap between a medium and head ABS is 40 nm. This magnetic recording apparatus carries out high density recording and reproduction of 6 GB per 1 square inch. Further as for the magnetic characteristic, by making its coercive force 2400 Oe, a product of the remnant magnetization Br and magnetic layer thickness 70 G·μm and magnetic gap between the medium and ABS 35 nm, it is possible to improve linear density so that high density recording/reproduction of 8 GB per 1 square inch is achieved.

Figure 30:
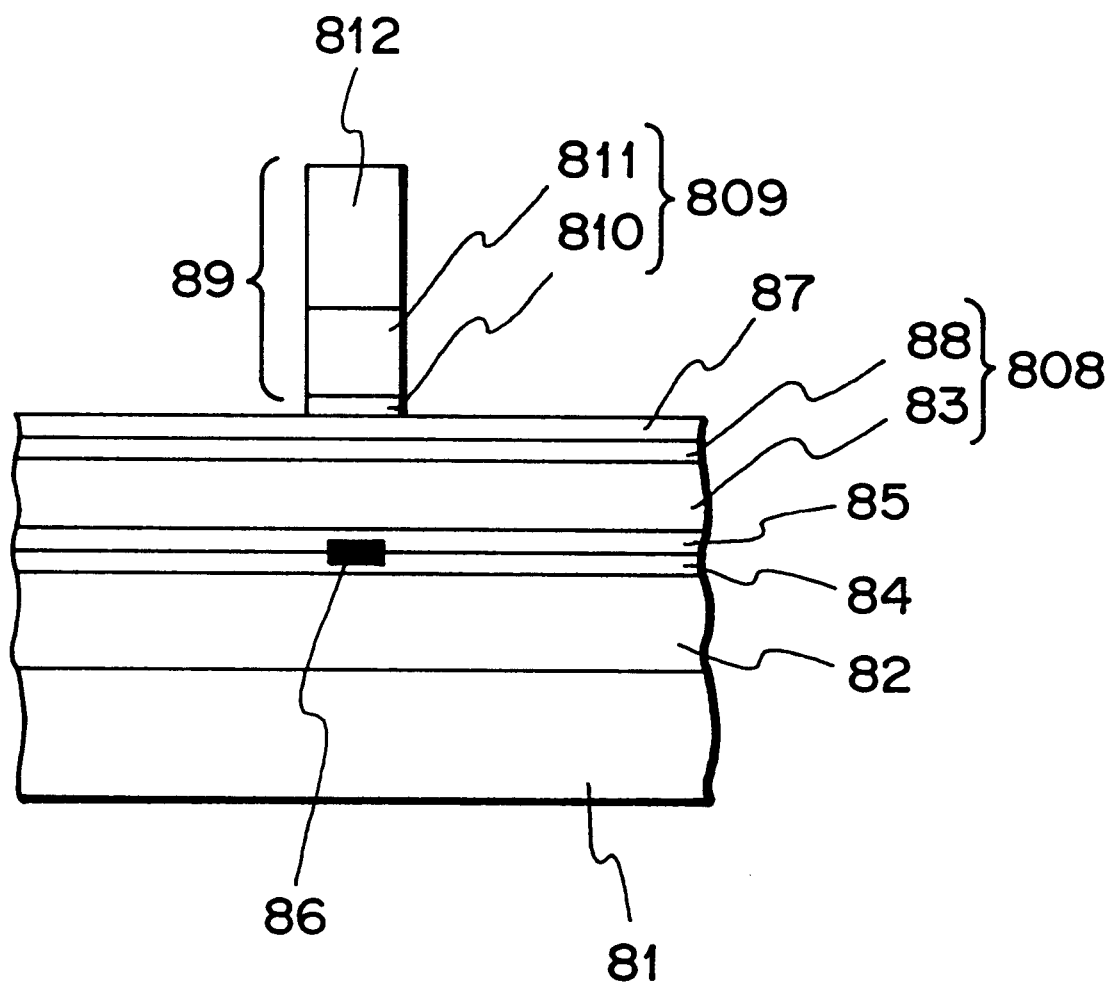
FIG. 30 is a front view taken from the air bearing surface showing the sixth embodiment of the composite head according to the present invention.

FIG. 30 shows a sixth embodiment of the present invention, which view is taken from the ABS. A substrate 81 which acts as a slider is composite ceramic essentially consisting of alumina and titan carbide. The MR head having a reading function is formed thereon. This MR head comprises a lower shield 82 made of patterned CoZrTa film, upper shield 83 made of NiFe and MR element 86 interposed therebetween and existing through magnetic separating layers made of alumina. The thickness of the lower shield 82 is 1 μm and the thickness of the upper shield 83 is 2 μm. Further, the gap between the upper shield 83 and lower shield 82 is 0.18 μm. As shown in FIG. 42, the MR element 86 interposed therebetween comprises the central region 16 sensitive to magnetic field from a recording medium and end portion regions 14, 15 having a function for supplying bias magnetic field and current to this central region 16. This central region 16 is formed of laminated structure having MR effect generally called spin valve effect and comprises bottom Ta film (5 nm thick), NiFe film (7 nm thick), CoFe film (1 nm thick), Cu film (2.5 nm thick), CoFe film (3 nm thick), and PtMn film (20 nm thick), arranged in this order from the lower shield 82. The width of the central region 16 is 0.6 μm, determining reproducing track width.

On this MR head is formed an ID head containing a first magnetic pole 808 comprising an upper shield 83 and CoTaZr film 88 of 0.7 μm in thickness formed on the upper shield 83 so as to possess recording function. As the ID head, the upper shield is used as the first recording magnetic pole and nonmagnetic insulator existing through a magnetic gap 87 made of alumina of 0.2 nm in film thickness determines zero throat height. This nonmagnetic insulator is made of photo resist, having a thickness of 1.5 μm. Further, a front end portion 809 of a second magnetic pole 89 is formed so as to expose to the ABS opposing a magnetic medium and partly ride over the nonmagnetic insulator. The front end portion 809 comprises CoTaZr film 810 and NiFe film 811 having a large saturated magnetization, which are arranged in this order from the magnetic gap 87, having film thickness of 0.7 μm and 1 μm. The step of this front end portion 809 is buried by the nonmagnetic insulator made of alumina film. A width for determining the recording track width of the front end portion 809 is 0.8 μm. Further, Cu coil covered with nonmagnetic insulator made of photo resist is formed on the nonmagnetic insulator and a main body portion 812 of a second magnetic pole 89 is formed so as to ride over this coil and front end portion 809. A thickness of the second magnetic pole 89 at the ABS is 2 μm. This composite head realizes high density magnetic recording and reproduction of 8 GB per 1 square inch.

Production method of this composite head will be described with reference to FIGS. 31 to 35. FIGS. 31 to 35 show production method for the embodiment of the magnetoresistive effect composite head according to the present invention. In the same Figures, production process of the read head is omitted and only production process of the recording ID head is shown.

Figure 31A:
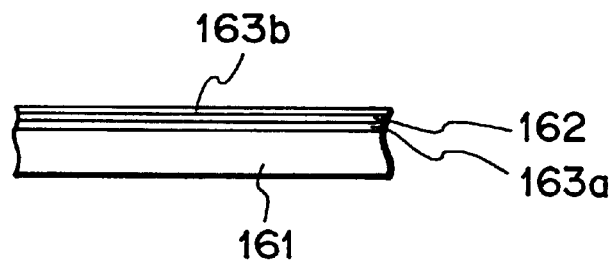
Figure 31B:
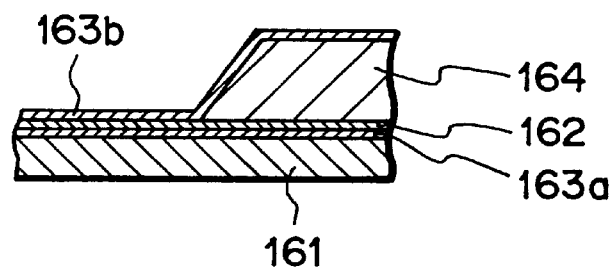
Figure 31C:
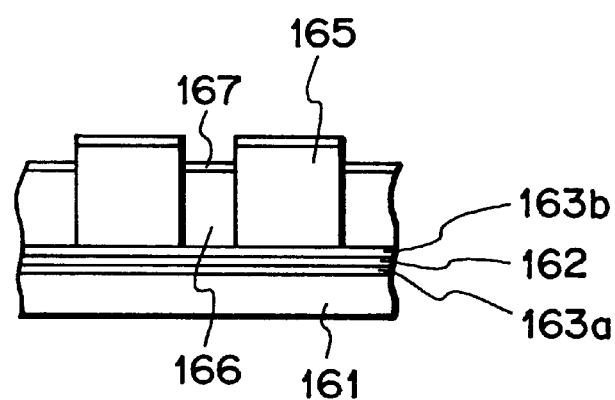
Figure 31D:
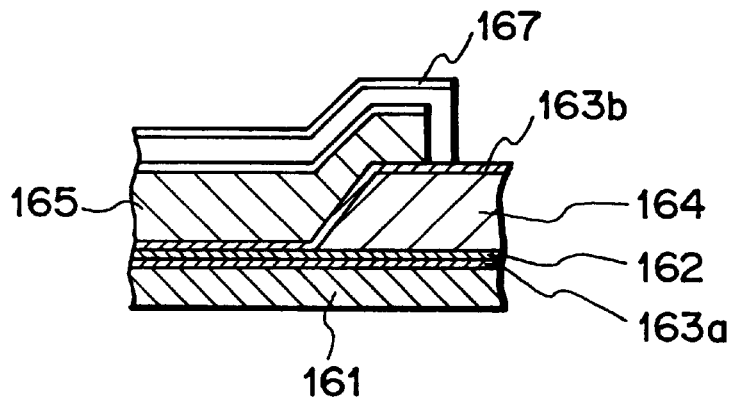
Figure 32A:
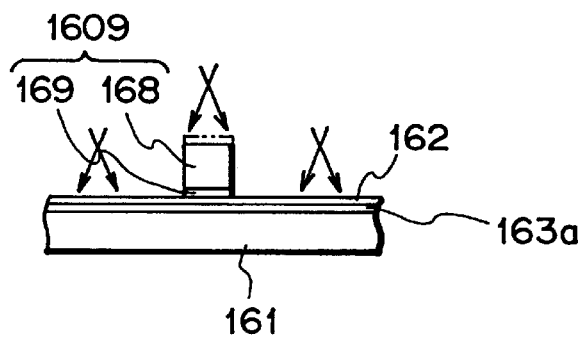
Figure 32B:
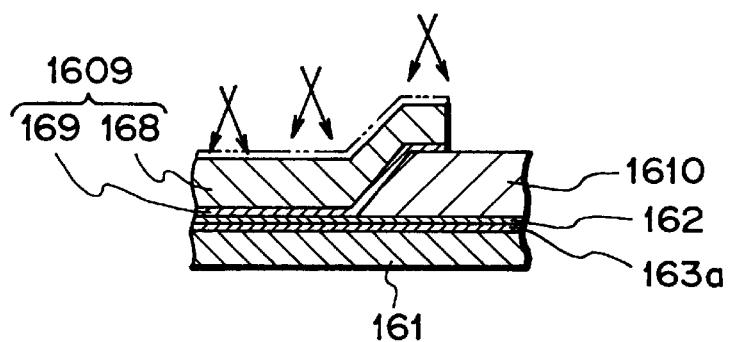
Figure 32C:
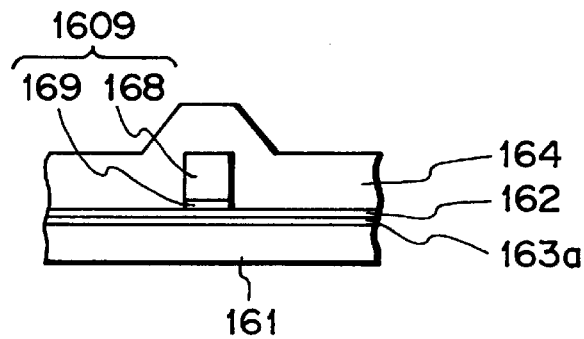
Figure 32D:
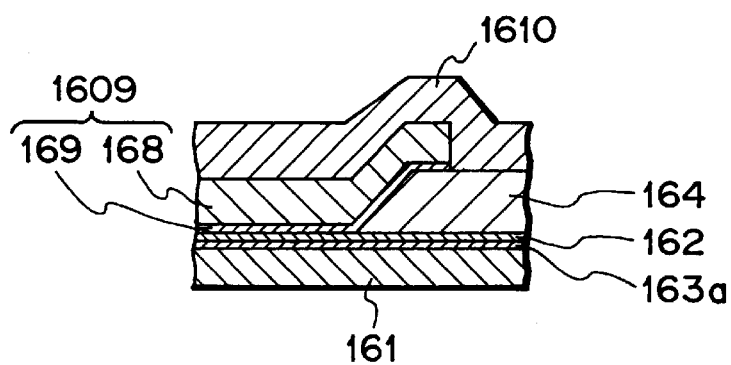
Figure 33A:
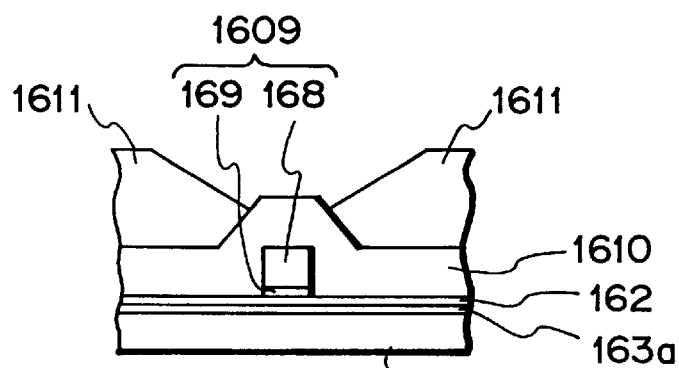
Figure 33B:
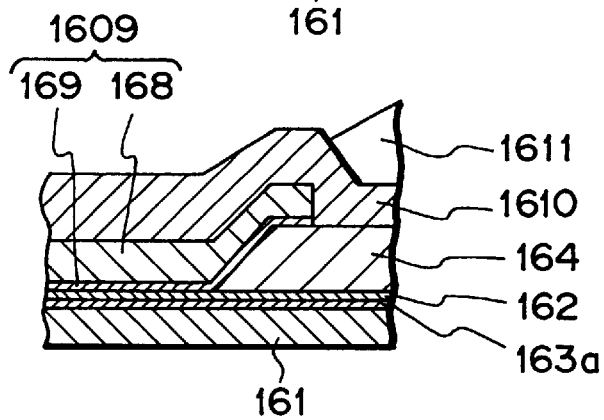
Figure 33C:
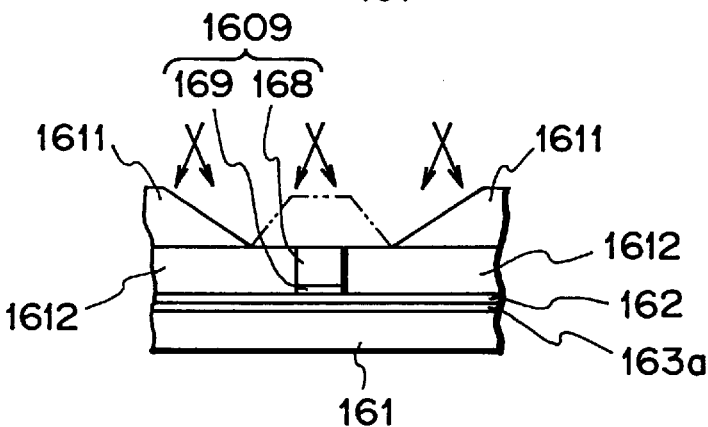
Figure 33D:
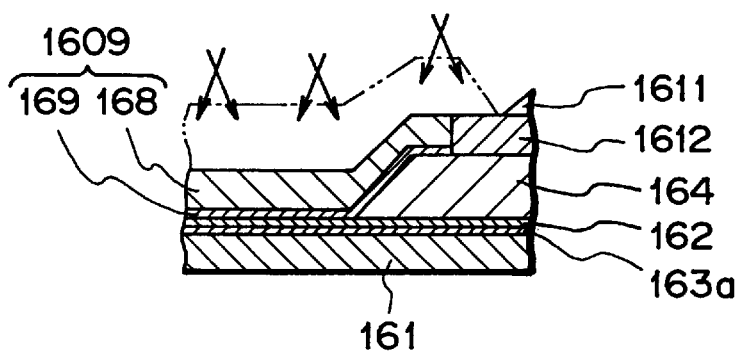

In pole height position defining nonmagnetic insulator forming step, photo resist pattern 164 is formed on a upper shield 161, CoTaZr film 163*a*, magnetic gap 162 and CoTaZr film 163*b* at a good precision (FIGS. 31A and 31B). At front end magnetic pole forming step, first a resist frame 165 is formed so as to ride over the photo resist pattern 164 (FIGS. 31C and 31D). This resist frame 165 encloses space on the photo resist pattern 164. At this time, because a step difference of the photo resist pattern 164 is as high as 2 to 3 μm, the thickness of the frame below the step can be about 3 μm. Thus, a small frame interval width of 0.8 μm can be realized. After that, NiFe 166 of the front end portion 1609 is formed by plating method. Corresponding to the frame interval width and frame height, a front end portion 1609 having a width of 0.8 μm and height of 2 μm is obtained. Further, considering the steps of FIGS. 32A and 32B, alumina film 167 is formed in thickness of 0.2 μm by sputtering. This reason is that because a sufficient thickness cannot be secured as the width of the front end portion 1609 is small when ion beam etching is carried out with the front end portion 1609 as a mask, an influence of reduction of the film thickness by the ion beam etching is reduced. Then, after the resist frame 165 and unnecessary NiFe 166 are removed, with the NiFe 166 of the front end portion 1609 as a mask, the CoTaZr film 163*a* is etched by ion beam etching so as to produce CoTaZr magnetic pole 169 having a side determining the same track width as the NiFe magnetic pole 168. Then, alumina film 1610 of nonmagnetic insulator having a sufficient thickness for burying the front end portion 1609 is formed by sputtering (FIGS. 32C and 32D). Then, resist cover 1611 for removing the alumina film 1610 on the front end portion 1609 is formed (FIGS. 33A and 33B). At this time, in next ion beam etching process, to improve the flatness of the surface of the alumina film 1612 and the top surface of the front end portion 1609 after the aforementioned removal, high temperature treatment of about 130° C. is carried out after coating with resist so as to gentle the resist end portion. Then, the alumina film 1611 is removed by ion beam etching (FIGS. 33C and 33D). The gentled resist mask retreats with a progress of ion beam etching and finally functions so as to improve the flatness of the surface of the alumina film 1612 and the top surface of the front end portion 1609.

Figure 34A:
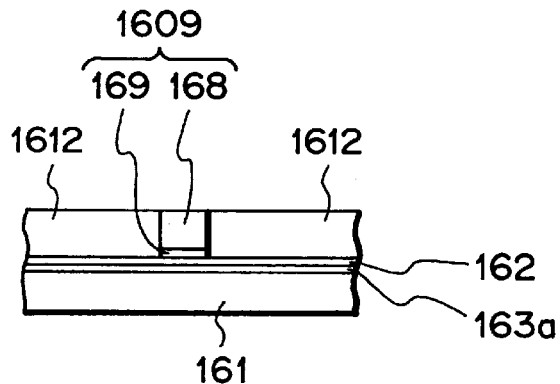
Figure 34B:
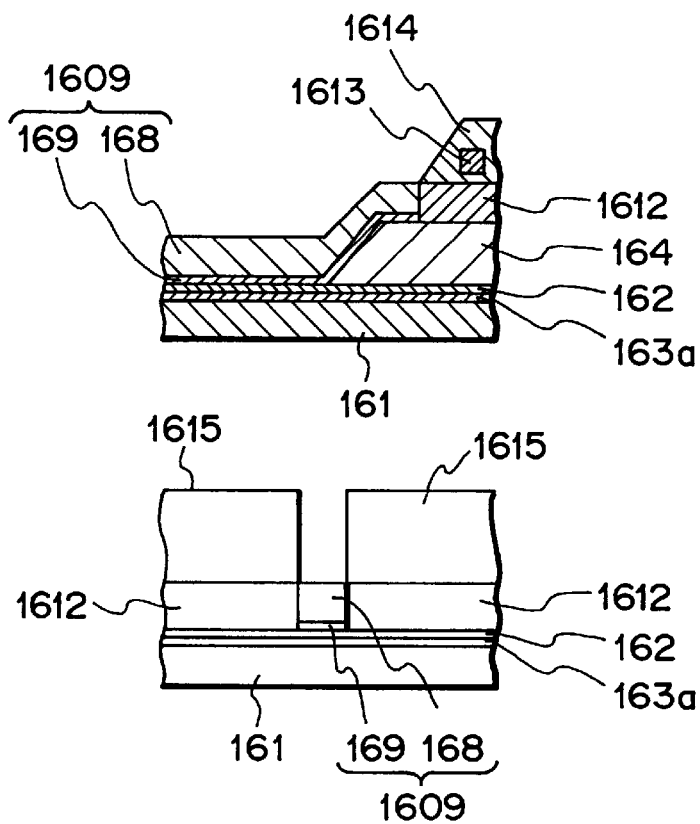
Figure 34C:
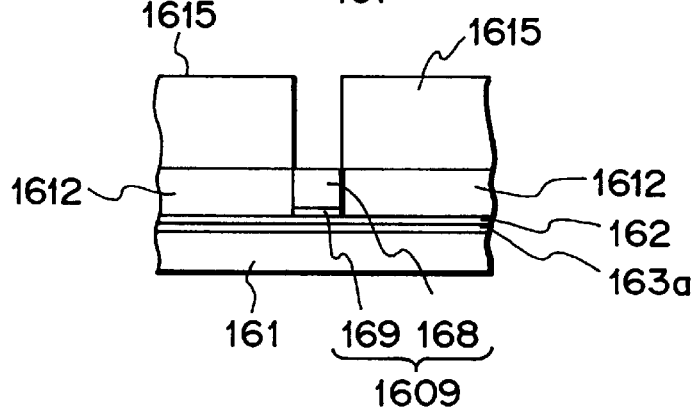
Figure 34D:
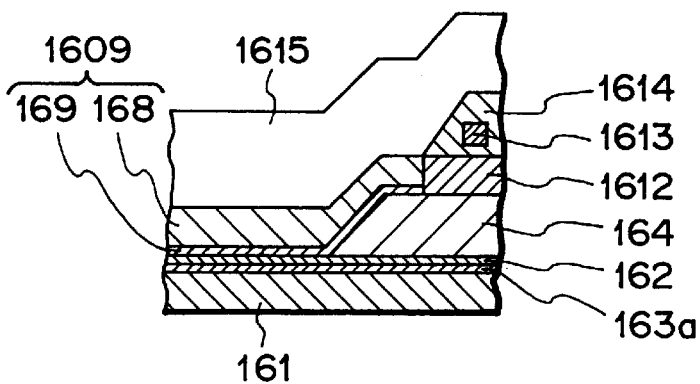
Figure 35A:
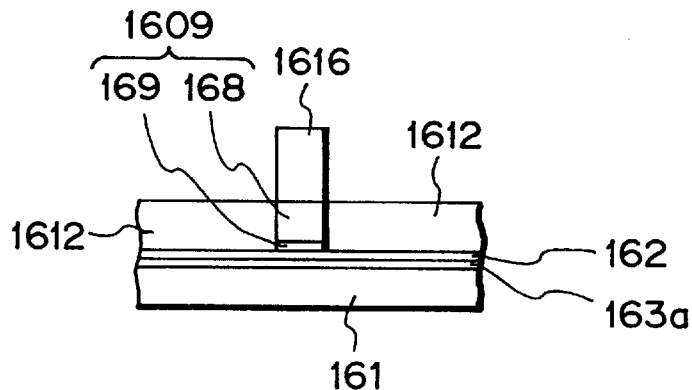
Figure 35B:
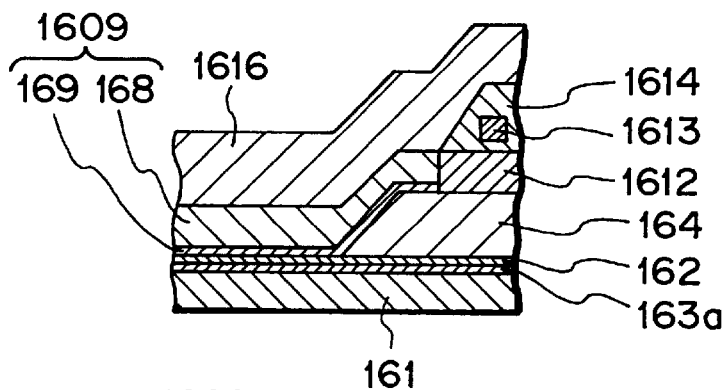
Figure 35C:
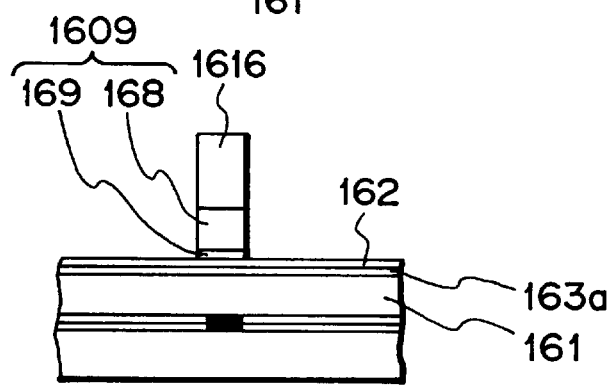
Figure 35D:
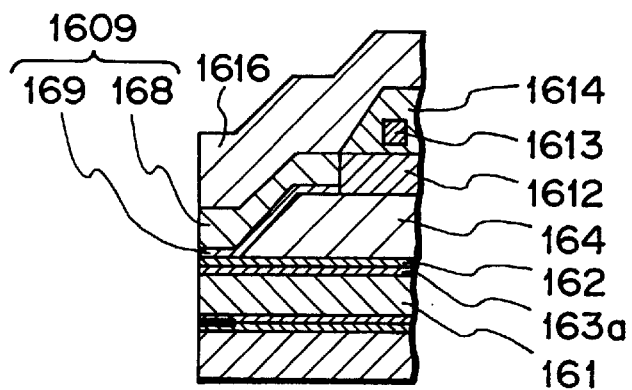

Next, coil 1613 covered with photo resist 1614 of nonmagnetic insulator is formed (FIGS. 34A and 34B). Then, to form a second magnetic pole main body portion 1616, resist frame 1615 properly positioned above the previously formed front end magnetic pole P2*a* is formed (FIGS. 34C and 34D). Because a difference of step by the coil 1613 and the like is larger than that upon forming the aforementioned front end portion 1609, frame thickness below the step is increased. As a result, resolution of resist is lowered. As for the main body portion 1616 formed in steps shown in FIGS. 35A and 35B, if a narrow front end portion 1609 is formed, as shown in FIG. 11, the width of the main body portion 1010 placed thereon may be larger than the width of the front end portion 109. In this case, the shape of the main body portion may be that of the main portion 1110 as shown in FIG. 12 to make it difficult for leaking magnetic flux between both edges (right/left) of the main body portion 1010 extended widely to both sides and the first magnetic pole 103 through the magnetic gap 107 to affect the recording characteristic. In alumina ion beam etching step shown in FIGS. 33C and 33D, by continuing ion beam etching after the alumina film covering the front end portion 1609 is removed also, the front end portion 1609 having a faster etching speed is etched earlier than the surrounding alumina film 1610, so that there is produced a step between the front end portion 1609 and alumina film 1610, thereby producing the main body portion 1110 having a shape shown in FIG. 12. Completion diagrams of FIGS. 35C and 35D correspond to FIG. 24.

The magnetic recording apparatus built up using the composite head of the present invention is a magnetic disk apparatus 180 shown in FIG. 5. This head opposes a magnetic medium at the ABS. As for the magnetic characteristic of the medium, its coercive force is 2500 Oe, a product of remnant magnetization Br and magnetic layer thickness is 70 G·μm and magnetic gap between a medium and head ABS is 40 nm. This magnetic recording apparatus carries out high density recording and reproduction of 7 GB per 1 square inch.

Figure 36:
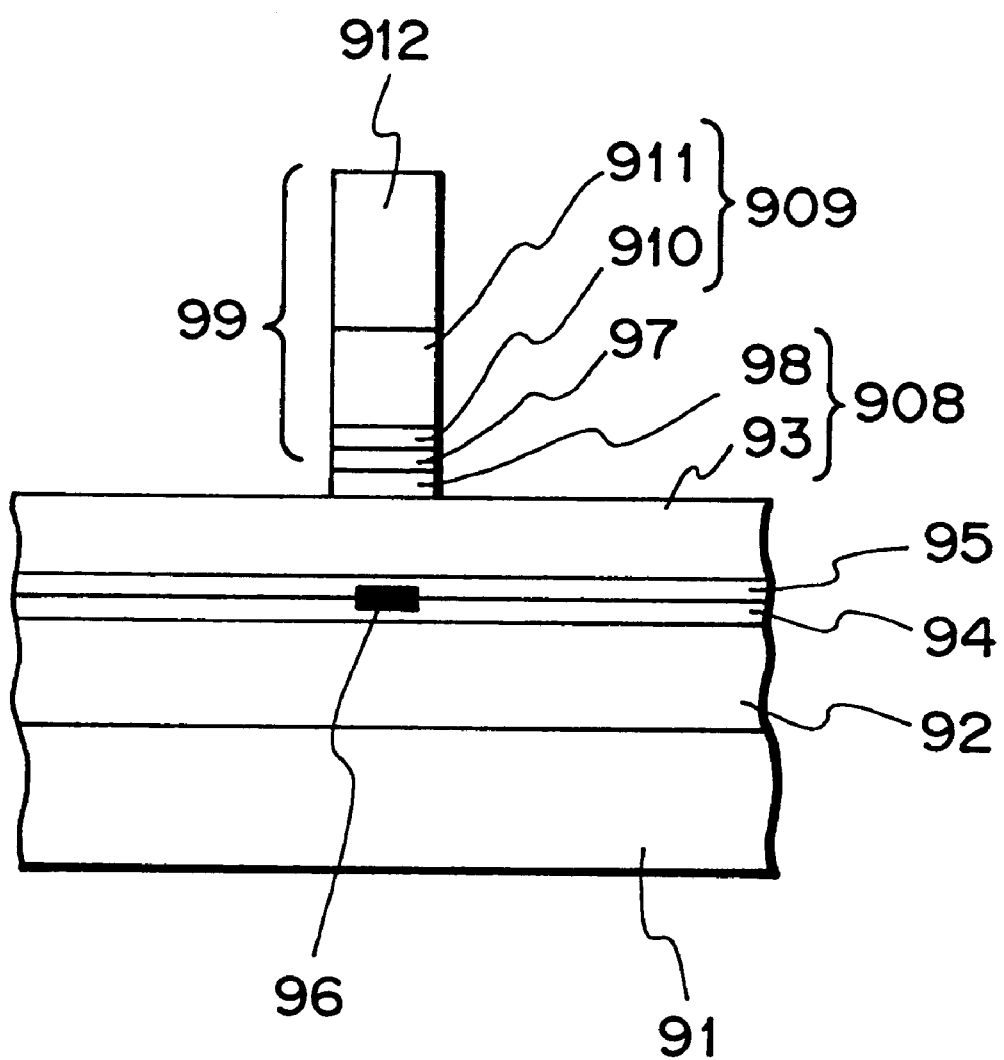
FIG. 36 is a front view taken from the air bearing surface showing the second embodiment of the composite head according to the present invention.

FIG. 36 shows a second embodiment of the present invention, which view is taken from the ABS. A substrate 91 which acts as a slider is composite ceramic essentially consisting of alumina and titan carbide. The MR head having a reading function is formed thereon. This MR head comprises a lower shield 92 made of patterned CoZrTa film, upper shield 93 made of NiFe and MR element 96 interposed therebetween and existing through magnetic separating layers made of alumina. The thickness of the lower shield 92 is 1 μm and the thickness of the upper shield 93 is 2 μm. Further, the gap between the upper shield 93 and lower shield 92 is 0.16 μm. As shown in FIG. 42, the MR element 96 interposed therebetween comprises the central region 16 sensitive to magnetic field from a recording medium and end portion regions 14, 15 having a function for supplying bias magnetic field and current to this central region 16. This central region 16 is formed of laminated structure having MR effect generally called spin valve effect and comprises bottom Ta film (5 nm thick), NiFe film (6 nm thick), CoFe film (2 nm thick), Cu film (2.5 nm thick), CoFe film (3 nm thick), and PtMn film (20 nm thick), arranged in this order from the lower shield 92. The width of the central region 16 is 0.5 μm, determining reproducing track width.

On this MR head is formed an ID head containing a first magnetic pole 908 comprising an upper shield 93 and CoTaZr film 98 of 0.5 μm in thickness formed on the upper shield 93 so as to possess recording function. As the ID head, the CoTaZr film 98 and the upper shield 93 are used as the first recording magnetic pole 908 and nonmagnetic insulator existing through a magnetic gap 97 made of alumina of 0.2 nm in film thickness determines zero throat height. This nonmagnetic insulator is made of photo resist, having a thickness of 1.5 μm. Further, a front end portion 909 of a second magnetic pole 99 is formed so as to expose to the ABS opposing a magnetic medium and partly ride over the nonmagnetic insulator. The front end portion 909 comprises CoTaZr film 910 and NiFe film 911 having a large saturated magnetization, which are arranged in this order from the magnetic gap 97, having film thickness of 0.5 μm and 1 μm. The step of this front end portion 909 is buried by the nonmagnetic insulator made of alumina film. A width for determining the recording track width of the front end portion 909 is 0.7 μm. Further, Cu coil covered with nonmagnetic insulator made of photo resist is formed on the nonmagnetic insulator and a main body portion 912 of a second magnetic pole 79 is formed so as to ride over this coil and front end portion 909. A thickness of the second magnetic pole 79 at the ABS is 2 μm. This composite head realizes high density magnetic recording and reproduction of 9 GB per 1 square inch.

Production method of this composite head will be described with reference to FIGS. 37 to 41. FIGS. 37 to 41 show production method for the embodiment of the magnetoresistive effect composite head according to the present invention. In the same Figures, production process of the read head is omitted and only production process of the recording ID head is shown.

Figure 37A:
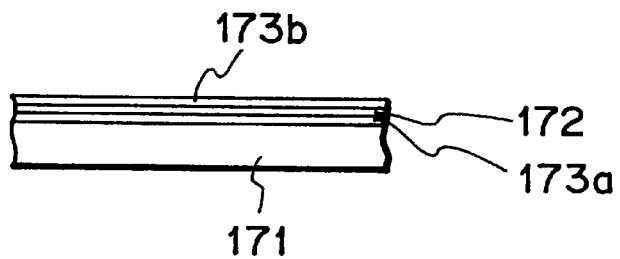
Figure 37B:
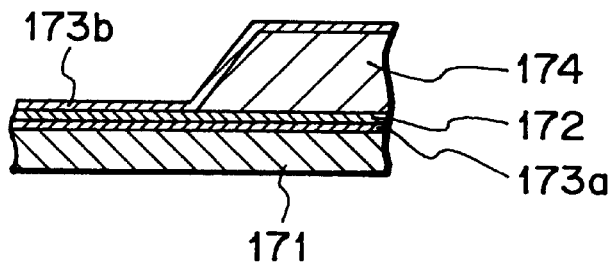
Figure 37C:
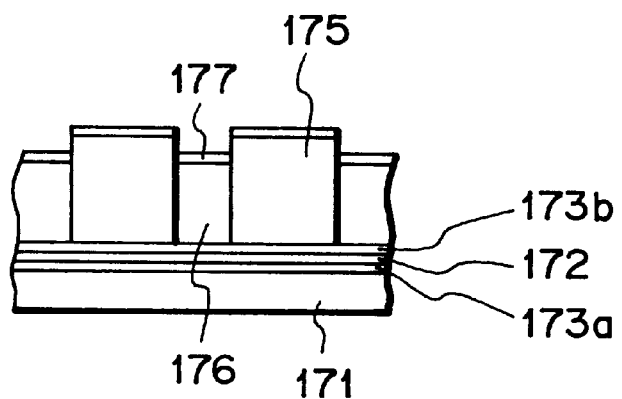
Figure 37D:
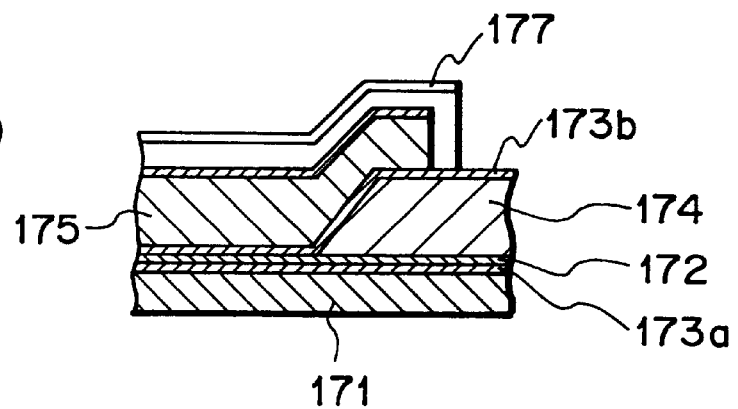
Figure 38A:
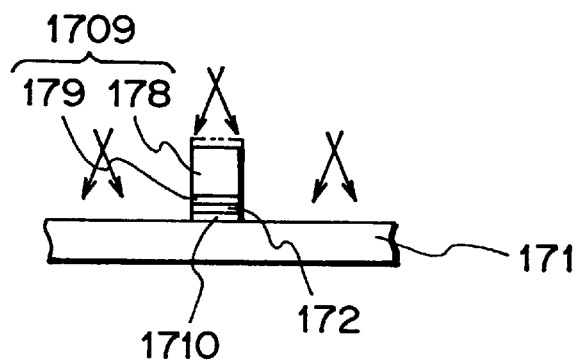
Figure 38B:
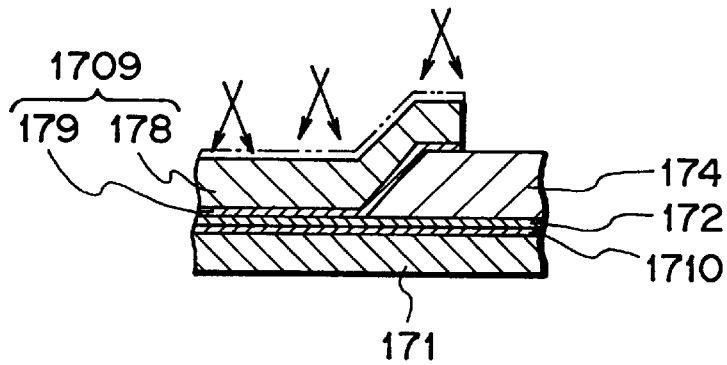
Figure 38C:
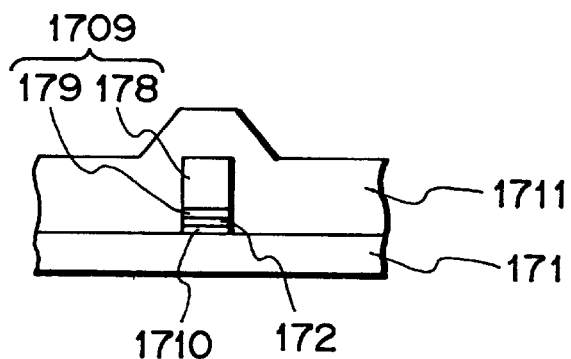
Figure 38D:
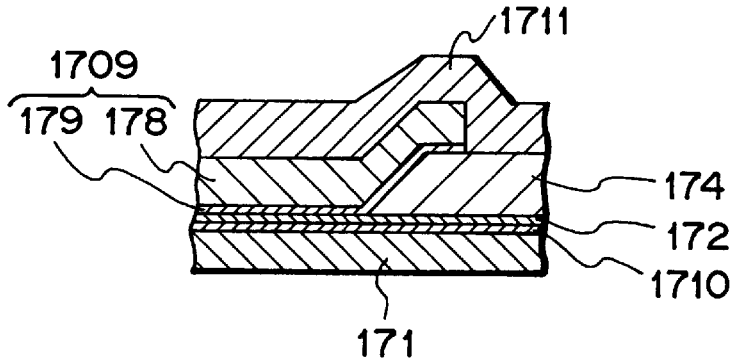
Figure 39A:
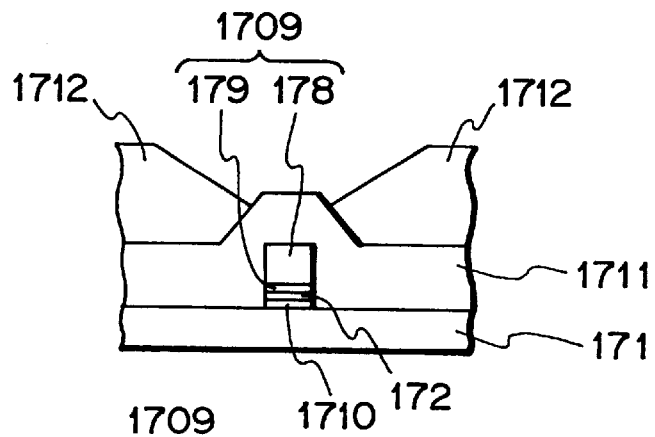
Figure 39B:
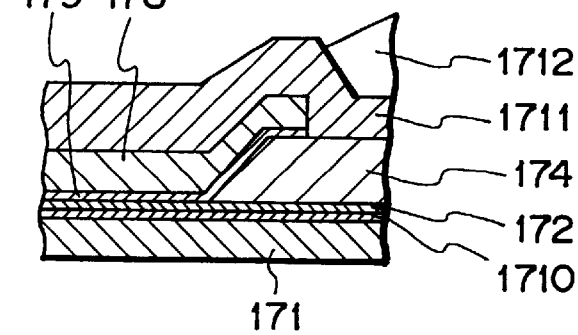
Figure 39C:
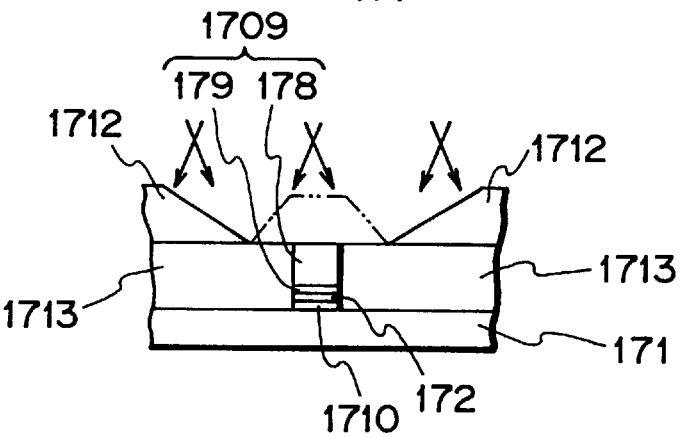
Figure 39D:
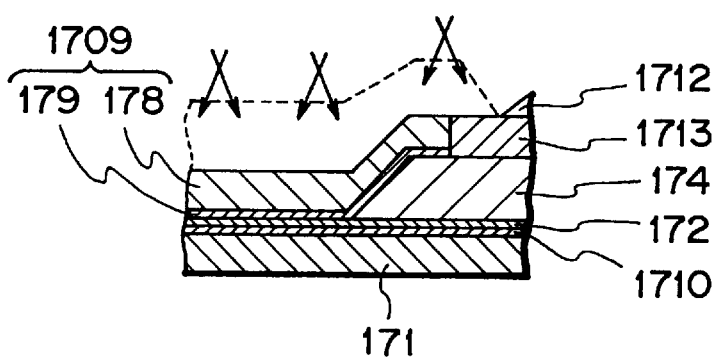

In pole height position defining nonmagnetic insulator forming step, photo resist pattern 174 is formed on a upper shield 171, CoTaZr film 173a, magnetic gap 172 and CoTaZr film 173b at a good precision (FIGS. 37A and 37B). At front end magnetic pole forming step, first a resist frame 175 is formed so as to ride over the photo resist pattern 174 (FIGS. 37C and 37D). This resist frame 175 encloses space on the photo resist pattern 174. At this time, because a step difference of the photo resist pattern 174 is as high as 2 to 3 μm, the thickness of the frame below the step can be about 3 μm. Thus, a small frame interval width of 0.7 μm can be realized. After that, NiFe 176 of the front end portion 1709 is formed by plating method. Corresponding to the frame interval width and frame height, a front end portion 1709 having a width of 0.7 μm and height of 2 μm is obtained. Further, considering the process of [3A, 3B], alumina film 177 is formed in thickness of 0.3 μm by sputtering. This reason is that because a sufficient thickness cannot be secured as the width of the front end portion 1709 is small when ion beam etching is carried out with the front end portion 1709 as a mask, an influence of reduction of the film thickness by the ion beam etching is reduced. Then, after the resist frame 175 and unnecessary NiFe 176 are removed, with the front end portion 1709 as a mask, the CoTaZr film 173a, magnetic gap 172 and CoTaZr film 173b are etched by ion beam etching so as to produce CoTaZr films 179, 1710 having a side determining the same track width as the NiFe magnetic pole 178 (FIGS. 38A and 38B). Then, alumina film 1711 of nonmagnetic insulator having a sufficient thickness for burying the front end portion 1709 is formed by sputtering (FIGS. 38C and 38D). Then, resist cover 1712 for removing the alumina film 1711 on the front end portion 1709 is formed (FIGS. 39C and 39D). At this time, in next ion beam etching process, to improve the flatness of the surface of the alumina film 1713 and the top surface of the front end portion 1709 after the aforementioned removal, high temperature treatment of about 130° C. is carried out after coating with resist so as to gentle the resist end portion. Then, the alumina film 1711 is removed by ion beam etching (FIGS. 39C and 39D). The gentled resist cover 1712 retreats with a progress of ion beam etching and finally functions so as to improve the flatness of the surface of the alumina film 1713 and the top surface of the front end portion 1709.

Figure 40A:
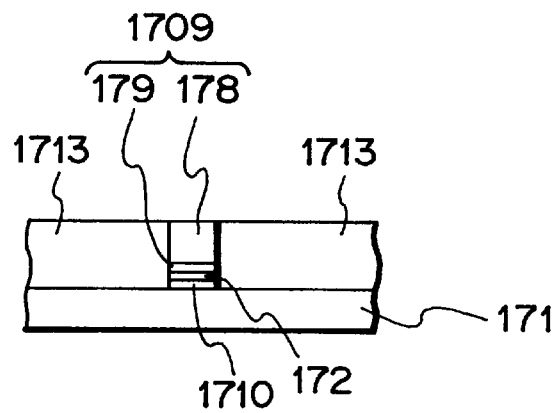
Figure 40B:
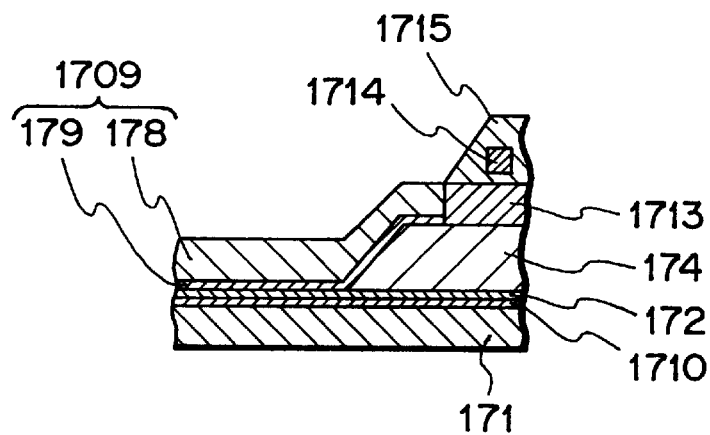
Figure 40C:
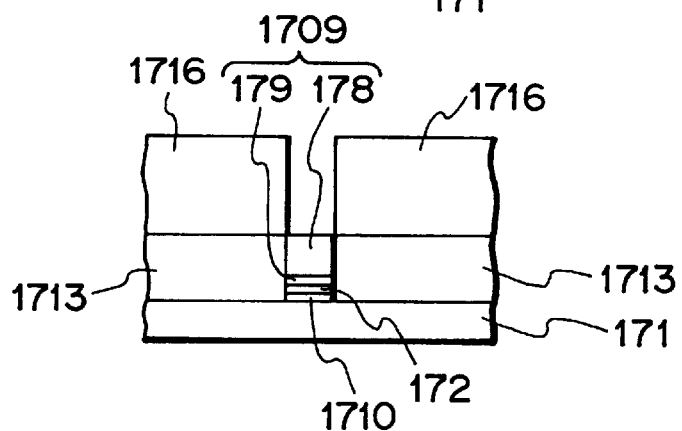
Figure 40D:
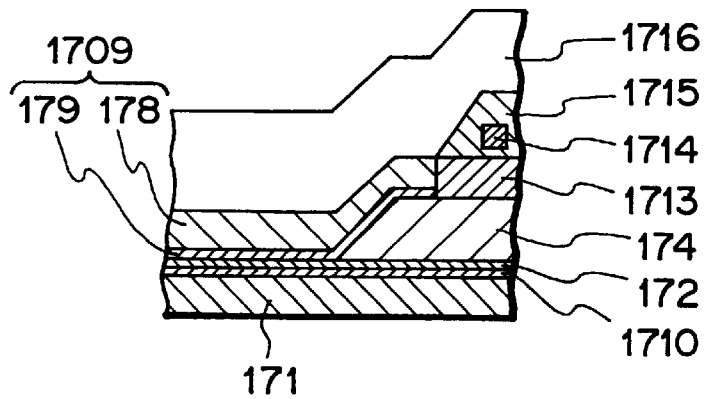
Figure 41A:
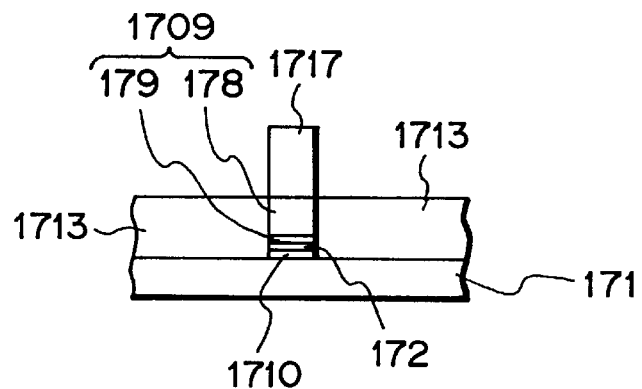
Figure 41B:
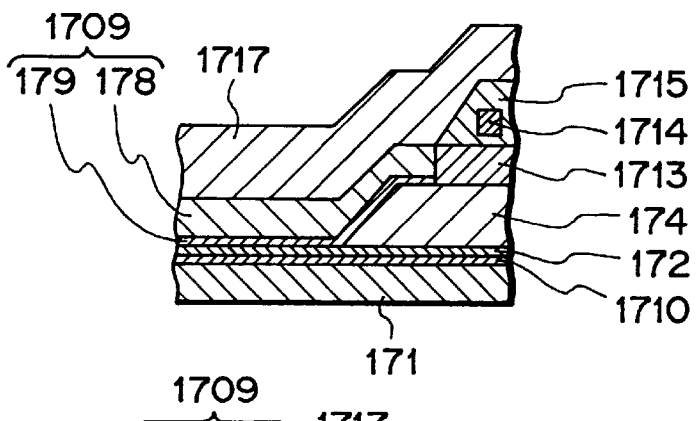
Figure 41C:
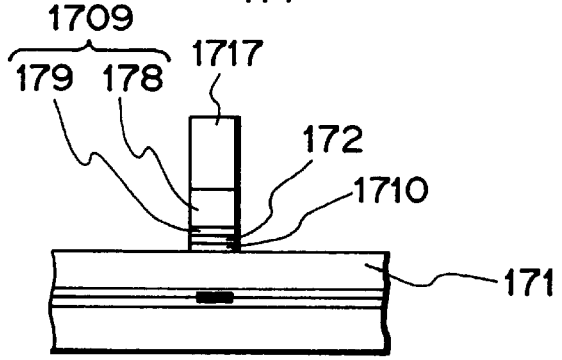
Figure 41D:
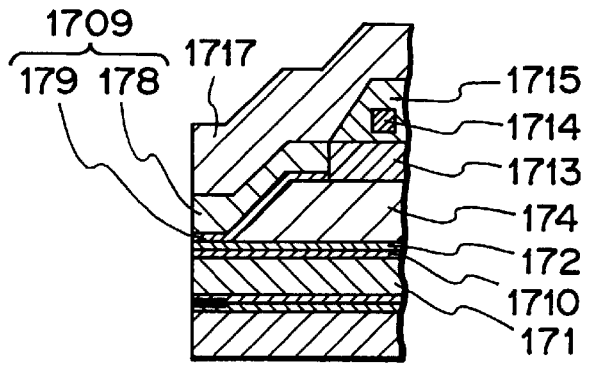

Next, coil 1714 covered with photo resist 1715 of nonmagnetic insulator is formed (FIGS. 40A and 40B). Then, to form a second magnetic pole main body portion 1717, resist frame 1716 properly positioned above the previously formed front end magnetic pole 1709 is formed. Because a difference of step by the coil 1714 and the like is larger than that upon forming the aforementioned front end portion 1709, frame thickness below the step is increased. As a result, resolution of resist is lowered. As for the main body portion 1717 formed in FIGS. 41A and 41B, if a narrow front end portion 1709 is formed, as shown in FIG. 11, the width of the main body portion 1010 placed thereon may be larger than the width of the front end portion 109. In this case, the shape of the main body portion may be that of the main body portion 1110 as shown in FIG. 12 to make it difficult for leaking magnetic flux between both edges (right/left) of the main body portion 1010 extended widely to both sides and the first magnetic pole 103 through the magnetic gap to affect the recording characteristic. In alumina ion beam etching step shown in FIGS. 39C and 39D, by continuing ion beam etching after the alumina film covering the front end portion 1709 is removed also, the front end portion 1709 having a faster etching speed is etched earlier than the surrounding alumina film 1711, so that there is produced a step between the front end portion 1709 and alumina film 1711, thereby producing the main body portion 1110 having a shape shown in FIG. 12. Completion diagrams of FIGS. 41C and 41D correspond to FIG. 36.

The magnetic recording apparatus built up using the composite head of the present invention is a magnetic disk apparatus 180 shown in FIG. 5. This head opposes a magnetic medium at the ABS. As for the magnetic characteristic of the medium, its coercive force is 2800 Oe, a product of remnant magnetization Br and magnetic layer thickness is 60 G·μm and magnetic gap between a medium and head ABS is 30 nm. This magnetic recording apparatus carries out high density recording and reproduction of higher than 9 GB per 1 square inch.

What is claimed is:

1. A magnetoresistive effect composite head comprising:
   a read head having: a lower shield and an upper shield on a substrate of a slider, said lower shield being between said substrate and said upper shield; and a magnetoresistive effect element interposed between said lower shield and said upper shield, and disposed within magnetic separating layers, said magnetic separating layers being interposed between said lower shield and said upper shield; and
   a recording head having: a first magnetic pole, which is said upper shield; a magnetic gap which is above said first magnetic pole; a first nonmagnetic insulator disposed above said magnetic gap relative to said first magnetic pole, said first nonmagnetic insulator defining a zero throat height; a second magnetic pole which has a front end portion exposed to an air bearing surface of said slider and partially disposed over said first nonmagnetic insulator, thereby forming a step difference between said front end portion and said first nonmagnetic insulator; a second nonmagnetic insulator, disposed on said first magnetic insulator for leveling said step difference; a coil which is formed on said second nonmagnetic insulator and covered with a third nonmagnetic insulator; and a main body portion which serves as a part of said second magnetic pole, and which is formed over said coil and the front end portion of said second magnetic pole.

2. A magnetoresistive effect composite head according to claim 1 wherein the track width of said front end portion is less than 2 μm.

3. A magnetoresistive effect composite head according to claim 1 wherein said front end portion is NiFe film.

4. A magnetoresistive effect composite head according to claim 1 wherein said first nonmagnetic insulator is photo resist.

5. A magnetoresistive effect composite head according to claim 1 wherein said second nonmagnetic insulator is alumina.

6. A magnetoresistive effect composite head according to claim 1 wherein said magnetoresistive effect element is spin valve film.

7. Magnetoresistive effect composite head according to claim 1 further comprising a third magnetic pole which exists between said first magnetic pole and magnetic gap and has a side coinciding with a side determining the width of said front end portion in the direction of the track width such that it is magnetically continuous with said first magnetic pole.

8. A magnetoresistive effect composite head according to claim 7 wherein the track width of said front end portion and said third magnetic pole is less than 2 μm.

9. A magnetoresistive effect composite head according to claim 7 wherein said front end portion is NiFe film.

10. A magnetoresistive effect composite head according to claim 7 wherein said first nonmagnetic insulator is photo resist.

11. A magnetoresistive effect composite head according to claim 7 wherein said second nonmagnetic insulator is alumina.

12. A magnetoresistive effect composite head according to claim 7 wherein said magnetoresistive effect element is spin valve film.

13. A magnetoresistive effect composite head according to claim 1 wherein said front end portion has a first magnetic film having a large saturated magnetization, said first magnetic film being provided on a side of said magnetic gap.

14. A magnetoresistive effect composite head according to claim 13 wherein the track width of said front end portion is less than 2 μm.

15. A magnetoresistive effect composite head according to claim 13 wherein said first magnetic film is composed of mainly Co—M or Fe—M—N (M is one or two or more selected from a group of Ti, V, Cr, Zr, Nb, Hf, Ta and W).

16. A magnetoresistive effect composite head according to claim 13 wherein said front end portion has the second magnetic film made of NiFe film, said second magnetic film being provided on an opposite side to said magnetic gap of said first magnetic film.

17. A magnetoresistive effect composite head according to claim 13 wherein said first nonmagnetic insulator is photo resist.

18. A magnetoresistive effect composite head according to claim 13 wherein said second nonmagnetic insulator is alumina.

19. A magnetoresistive effect composite head according to claim 13 wherein said magnetoresistive effect element is spin valve film.

20. A magnetoresistive effect composite head according to claim 1 further comprising:

a third magnetic pole which exists between said first magnetic pole and magnetic gap and has a side coinciding with a side determining the width of said front end portion in the direction of the track width such that it is magnetically continuous with said first magnetic pole, wherein said front end portion has the first magnetic film having a large saturated magnetization, said first magnetic film being provided on a side of said magnetic gap.

21. A magnetoresistive effect composite head according to claim 20 wherein the track width of said front end portion is less than 2 μm.

22. A magnetoresistive effect composite head according to claim 20 wherein said first magnetic film is composed of mainly Co—M or Fe—M—N (M is one or two or more selected from a group of Ti, V, Cr, Zr, Nb, Hf, Ta and W).

23. A magnetoresistive effect composite head according to claim 20 wherein said front end portion has the second magnetic film made of NiFe film, said second magnetic film being provided on an opposite side to said magnetic gap of said first magnetic film.

24. A magnetoresistive effect composite head according to claim 20 wherein said first nonmagnetic insulator is photo resist.

25. A magnetoresistive effect composite head according to claim 20 wherein said second nonmagnetic insulator is alumina.

26. A magnetoresistive effect composite head according to claim 20 wherein said magnetoresistive effect element is spin valve film.

27. A magnetoresistive effect composite head according to claim 1 wherein said front end portion has a first magnetic film having a large saturated magnetization, said first magnetic film being provided on a side of said magnetic gap, said first magnetic pole containing the third magnetic film having a large saturated magnetization, said third magnetic film being provided on a side of said magnetic gap.

28. A magnetoresistive effect composite head according to claim 27 wherein the track width of said front end portion is less than 2 μm.

29. A magnetoresistive effect composite head according to claim 27 wherein said first magnetic film and said third magnetic film are composed of mainly Co—M o Fe—M—N (M is one or two or more selected from a group of Ti, V, Cr, Zr, Nb, Hf, Ta and W).

30. A magnetoresistive effect composite head according to claim 27 wherein said front end portion has the second magnetic film made of NiFe film, said second magnetic film being provided on an opposite side to said magnetic gap of said first magnetic film.

31. A magnetoresistive effect composite head according to claim 27 wherein said first nonmagnetic insulator is photo resist.

32. A magnetoresistive effect composite head according to claim 27 wherein said second nonmagnetic insulator is alumina.

33. A magnetoresistive effect composite head according to claim 27 wherein said magnetoresistive effect element is spin valve film.

34. A magnetoresistive effect composite head according to claim 1 further comprising:

a third magnetic pole having a large saturated magnetization, which exists between said first magnetic pole and magnetic gap and has a side coinciding with a side determining the width of said front end portion in the direction of the track width such that it is magnetically continuous with said first magnetic pole, wherein said front end portion has the first magnetic film having a large saturated magnetization, said first magnetic film being provided on a side of said magnetic gap.

35. A magnetoresistive effect composite head according to claim 34 wherein the track width of said front end portion is less than 2 μm.

36. A magnetoresistive effect composite head according to claim 34 wherein said first magnetic film and said third magnetic pole are composed of mainly Co—M or Fe—M—N (M is one or two or more selected from a group of Ti, V, Cr, Zr, Nb, Hf, Ta and W).

37. A magnetoresistive effect composite head according to claim 34 wherein said front end portion has the second magnetic film made of NiFe film, said second magnetic film being provided on an opposite side to said magnetic gap of said first magnetic film.

38. A magnetoresistive effect composite head according to claim 34 wherein said first nonmagnetic insulator is photo resist.

39. A magnetoresistive effect composite head according to claim 34 wherein said second nonmagnetic insulator is alumina.

40. A magnetoresistive effect composite head according to claim 34 wherein said magnetoresistive effect element is spin valve film.

41. A magnetoresistive effect composite head according to claim 1 wherein the width of said front end portion in the direction for determining the recording track width is narrower than said main body portion, and a distance from said main body portion extending to both sides from said front end portion is a distance from a surface in which said front end portion is in contact with said main body portion to said magnetic gap.

* * * * *